United States Patent [19]

Taniguchi et al.

[11] Patent Number: 5,036,350
[45] Date of Patent: Jul. 30, 1991

[54] CAMERA SYSTEM

[75] Inventors: Nobuyuki Taniguchi, Tondabayashi; Masatake Niwa, Sakai; Akira Fujii, Sennan; Takeo Hoda, Sakai; Masaaki Nakai, Kitakatsuragi; Minoru Sekida, Sakai; Masayoshi Sahara, Sennan, all of Japan

[73] Assignee: Minolta Camera Kabushiki Kaisha, Osaka, Japan

[21] Appl. No.: 539,439

[22] Filed: Jun. 18, 1990

Related U.S. Application Data

[62] Division of Ser. No. 309,654, Feb. 13, 1989, Pat. No. 4,947,203, which is a division of Ser. No. 220,066, Jul. 15, 1988, Pat. No. 4,860,046, which is a division of Ser. No. 42,758, Jul. 23, 1986, Pat. No. 4,763,144, which is a division of Ser. No. 888,600, Jul. 26, 1986, Pat. No. 4,712,904, which is a division of Ser. No. 634,474, Jul. 25, 1984, Pat. No. 4,621,914.

[30] Foreign Application Priority Data

| Jul. 27, 1983 | [JP] | Japan | 58-138129 |
| Jul. 29, 1983 | [JP] | Japan | 58-1396000 |
| Aug. 8, 1983 | [JP] | Japan | 58-144547 |
| Aug. 8, 1983 | [JP] | Japan | 58-144549 |
| Aug. 17, 1983 | [JP] | Japan | 58-150572 |
| Jun. 22, 1984 | [JP] | Japan | 59-129572 |
| Jun. 25, 1984 | [JP] | Japan | 59-131452 |
| Jun. 25, 1984 | [JP] | Japan | 59-131453 |

[51] Int. Cl.⁵ .................................................. G03B 17/18
[52] U.S. Cl. .................................. 354/475; 354/289.12
[58] Field of Search ............ 354/471, 474, 475, 289.1, 354/289.12

[56] References Cited

U.S. PATENT DOCUMENTS 4,149,795 4/1979 Sakurada et al. ................. 354/475
4,956,661 9/1990 Taniguchi et al. ............. 354/471 X Primary Examiner—W. B. Perkey
Attorney, Agent, or Firm—Watson, Cole, Grindle & Watson

[57] ABSTRACT

A camera has an automatic data reading arrangement for reading ISO data provided on a film cartridge. When a main battery is exchanged with an old battery while the film is still loaded in the camera, ISO data is maintained in a memory supported and powered by a back-up battery. If such an ISO data is not available after the exchange of the main battery, ISO data again read from the loaded film cartridge is employed. If the film is not the type that can provide an ISO data, the most widely used ISO data will be automatically set for the further exposure calculation.

6 Claims, 17 Drawing Sheets

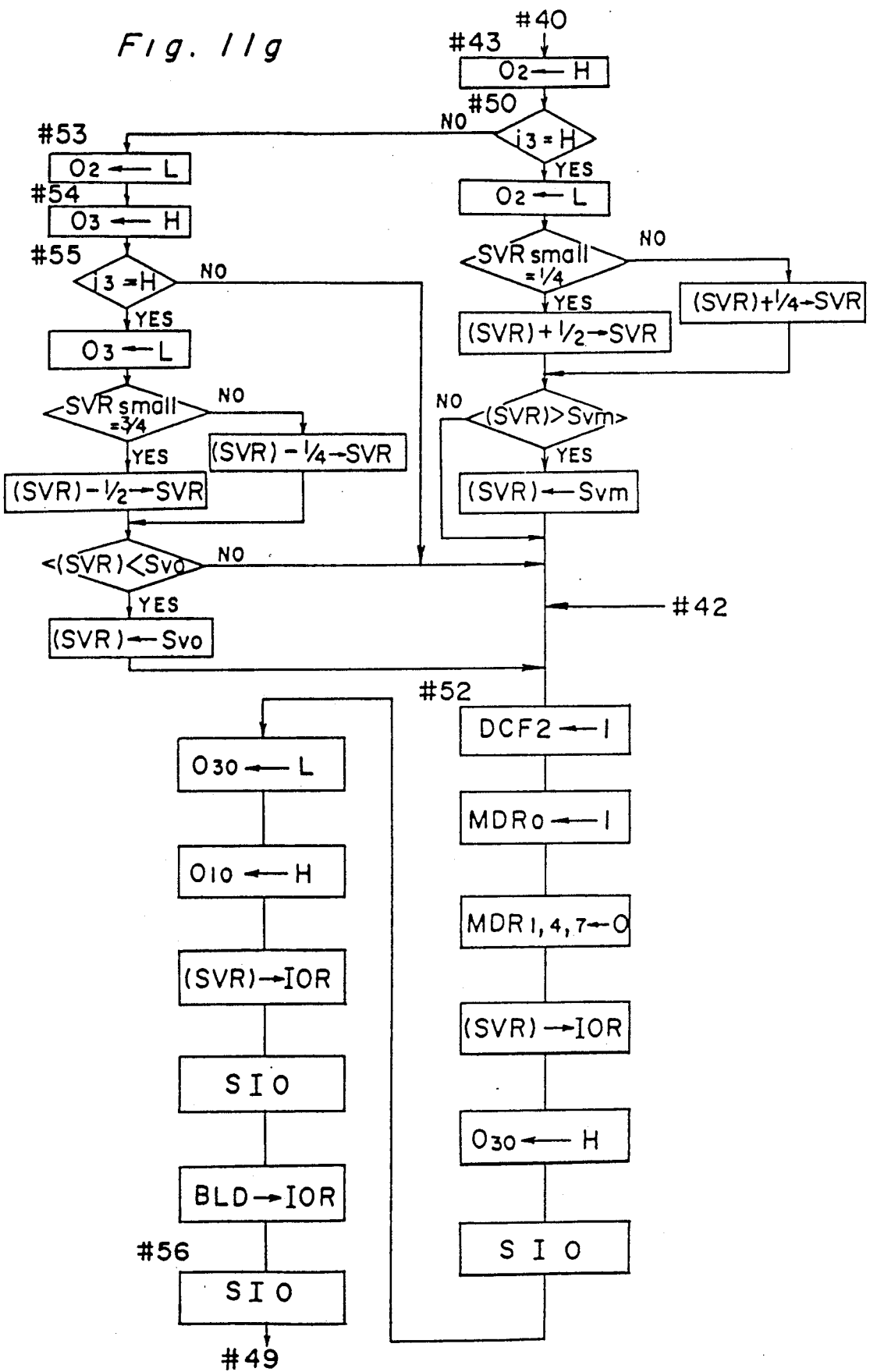

CAMERA SYSTEM

This application is a divisional application of application Ser. No. 309,654, filed Feb. 13, 1989, now U.S. Pat. No. 4,947,203 which is a divisional application of application Ser. No. 220,066, filed July 15, 1988, now U.S. Pat. No. 4,860,046 which is a divisional application of application Ser. No. 043,758, now U.S. Pat. No. 4,763,144, which is a divisional application of application Ser. No. 888,600, filed July 23, 1986, now U.S. Pat. No. 4,712,904, which in turn was a divisional application of application Ser. No. 634,474, filed July 25, 1984, now U.S. Pat. No. 4,621,914.

BACKGROUND OF THE INVENTION

1. Field of the Invention

The present invention relates to a photographic camera capable of functioning with stored data such as, for example, stored data of the film speed.

2. Description of the Prior Art

For the purpose of setting the film speed in a photographic camera, it has been proposed to provide a surface of a film cartridge with a code pattern comprised of particular combinations of conductive and non-conductive areas in correspondence with the film speed. When such a film cartridge is loaded in the camera, a plurality of feelers provided in the camera detect such a particular combination of conductive and non-conductive areas to set the film speed automatically in the camera.

SUMMARY OF THE INVENTION

The present invention has for its object to improve a camera capable of reading the code pattern, when the film cartridge of the type referred to above is loaded in the camera, and then setting the film speed automatically.

Another object of the present invention is to improve a camera capable of storing data, read out from the code pattern, and functioning on the basis of the data so stored.

A further object of the present invention is to improve a camera capable of effecting a display on the basis of the stored data.

A still further object of the present invention is to provide a camera wherein the setting of the film speed can also be carried out manually.

Another object of the present invention is to improve a camera with respect to the power source necessary for storing the data.

In order to accomplish these objects of the present invention, the present invention has numerous features as described below. According to one feature of the present invention, the reading of film speed data from the code pattern on the film cartridge is carried out prior to an exposure to the first effective frame of the film, for example, upon the closure of a camera back lid, and will no longer be carried out subsequent to the completion of the reading unless some urgency should occur. The camera then functions on the basis of the data stored upon the reading of the data from the code pattern.

According to another feature of the present invention, the reading of the code pattern is performed after a lapse of a predetermined time period after the back lid has been closed, during which the position of the film cartridge has been stabilized.

According to a further feature of the present invention, the stored data on the film speed can be manually altered as desired so that a photographer can set the film speed manually.

According to a still further feature of the present invention, there is provided a means for copying the stored data of the film speed and also for retaining the copied data even when a loss of the storing function occurs as a result of the interruption of power thereto. And when the power recovers, and if the copying and retaining means is effective at this time, the retained data is transferred back to the storing means such that the data is the same as was stored therein prior to the interruption of the power. Further, if the copying and retaining means is not effective at the time of the recovery of the power, the result of the reading of the code pattern on the film cartridge, which is prepared upon the recovery of the power, is transferred to the storing means.

According to another feature of the present invention, in the event that the copying and retaining means is not effective at the time of the recovery of the power or when the film cartridge having data is not loaded in the camera, a release-locked condition is carried out for a predetermined period of time thereby to warn the photographer to ascertain if the film speed setting is a desirable one. It is, however, to be noted that, according to a feature of the present invention, the release-locked condition will not be performed when the film is not prepared.

According to a further feature of the present invention, in the event that the photographer becomes aware that the film speed has been improperly set and, therefore, alters the setting in the storing means manually, the above described release-locked condition is immediately cancelled.

According to a still further feature of the present invention, the copying operation of the copying and retaining means is performed each time new data are stored at the storing means.

According to another feature of the present invention, in addition to an initiating operation of normal light measurement and calculation, light measurement and calculation can be initiated also in response to the manual operation effected to alter the stored data.

According to yet another feature of the present invention, there is used a display means capable of displaying the film speed data before the film is advanced to the first effective frame, but calculated exposure data is used after the film has been advanced to the first effective frame.

BRIEF DESCRIPTION OF THE DRAWINGS

These and other objects and features of the present invention will become apparent from the following description taken in conjunction with the preferred embodiments thereof in connection with the following drawings, in which:

FIG. 5 is a circuit diagram showing a detail of the circuit CIM of FIG. 4a;

FIG. 6 is a circuit diagram showing a detail of a circuit CAD and a circuit EM of FIG. 4a;

FIGS. 11a to 11h show a flow chart for the camera control under various operating modes;

FIGS. 14a and 14b are plan views of a display employed in the present invention.

DETAILED DESCRIPTION OF THE EMBODIMENT

The present invention will now be described in connection with a preferred embodiment thereof with reference to the accompanying drawings.

Figure 1:
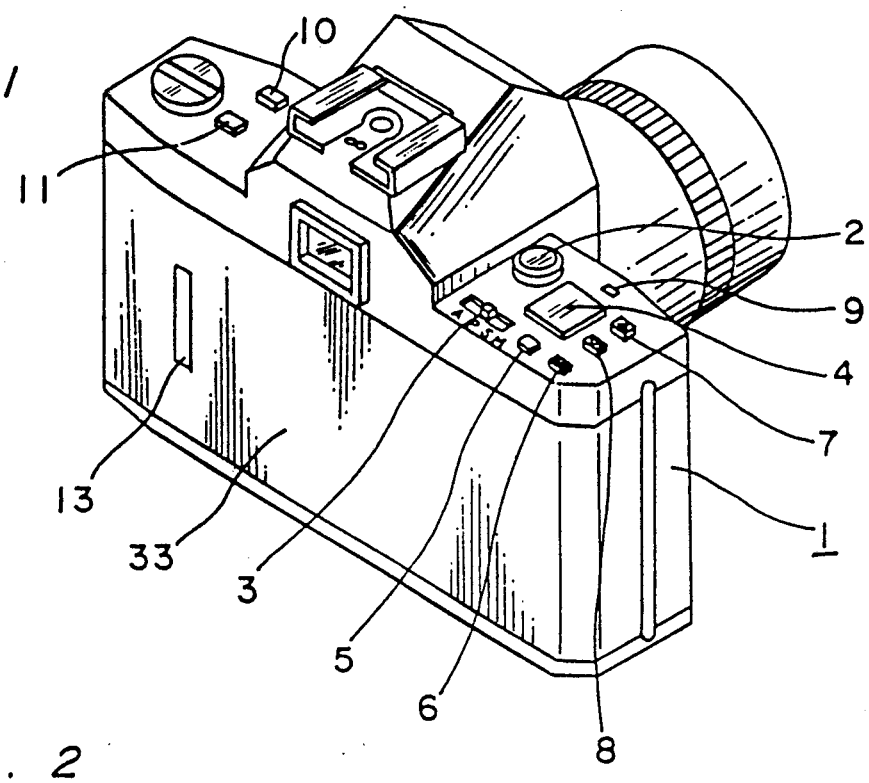
FIG. 1 is a perspective view of a camera system according to a preferred embodiment of the present invention.

Referring first to FIG. 1, a camera body 1 is shown as having a release button 2 which actuates a light measuring switch (not shown) for performing a light measurement when it is depressed halfway and actuates a release switch (not shown) when it is depressed fully for actuating a shutter.

Reference numeral 3 represents a mode change-over switch employed in the form of a slide switch, movable to P, S, M and A positions: the P position represents a programmed mode; the S position represents an exposure time priority mode in which the aperture is automatically controlled; the M position represents a manual mode; and the A position represents an aperture priority mode in which the exposure time is automatically controlled. Reference numeral 4 represents a display section for displaying a control exposure time, an aperture value, a film sensitivity, and override data. An example of the display is shown in FIG. 14.

Reference numeral 5 represents an aperture value setting key, reference numeral 6 represents a shutter speed setting key, and reference numerals 7 and 8 respectively represent up-shift and down-shift keys for changing the value of a selected item, such as aperture value F or shutter speed SS. A counter display window 9 displays the number of film frames photographed.

Reference numeral 10 represents an ISO mode key. When this ISO mode key 10 is depressed, ISO data utilized in the camera body 1 are displayed on the display section 4 and can be changed at any time by means of the up-shift and down-shift keys 7 and 8.

Reference numeral 11 represents an override key. When this override key 11 is depressed, override data are displayed on the display section 4 and can be changed at any time by the manipulation of the up-shift and down-shift keys 7 and 8. Reference numeral 13 represents a film information display window provided in a back cover 13 of the camera body 1.

Figure 2:
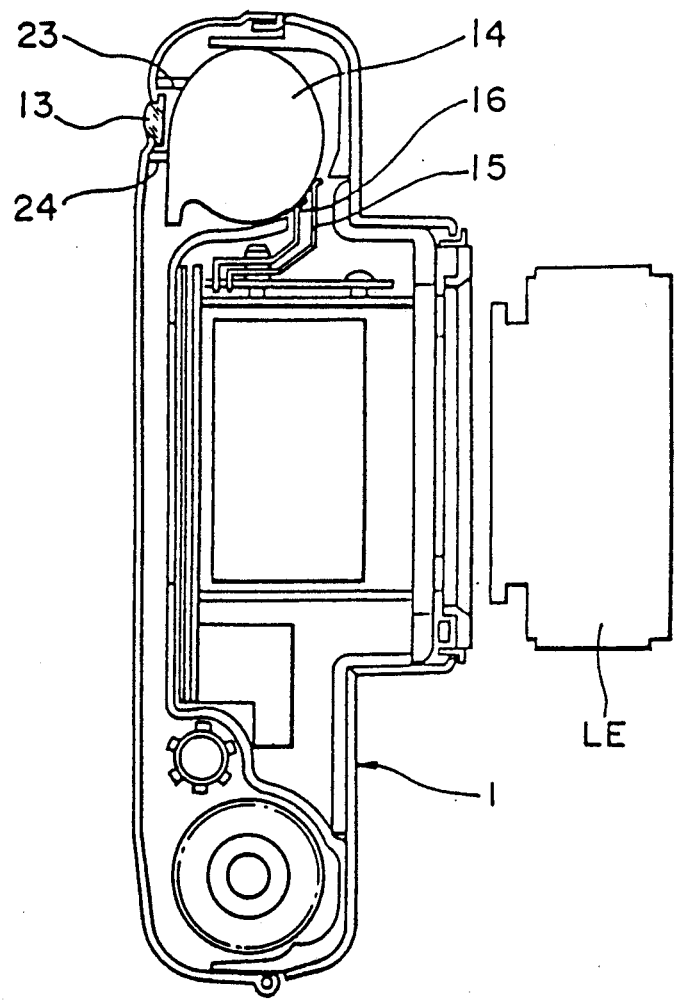
FIG. 2 is a diagrammatic view showing relationship between a loaded film cartridge and feelers for reading data provided on the film cartridge.

Within the camera body 1 shown in FIG. 1, there is provided, as shown in FIG. 2, code read-out feelers 15 and 16 for reading the ISO data provided on a film cartridge 14. These feelers 15 and 16 have a plurality of feeler pieces AT2-AT6, FT8, FT9, FT10, RT11, and RT12 (FIG. 6) adapted to contact code electrodes K1 to K10 formed on the outer peripheral surface of the film cartridge 14, for example, in a matrix of six rows and two columns.

Each of these feeler pieces AT2 to RT12 are fixed by means of vices to a post 18 made of an insulating material and planted within the camera body 1.

Figure 3:
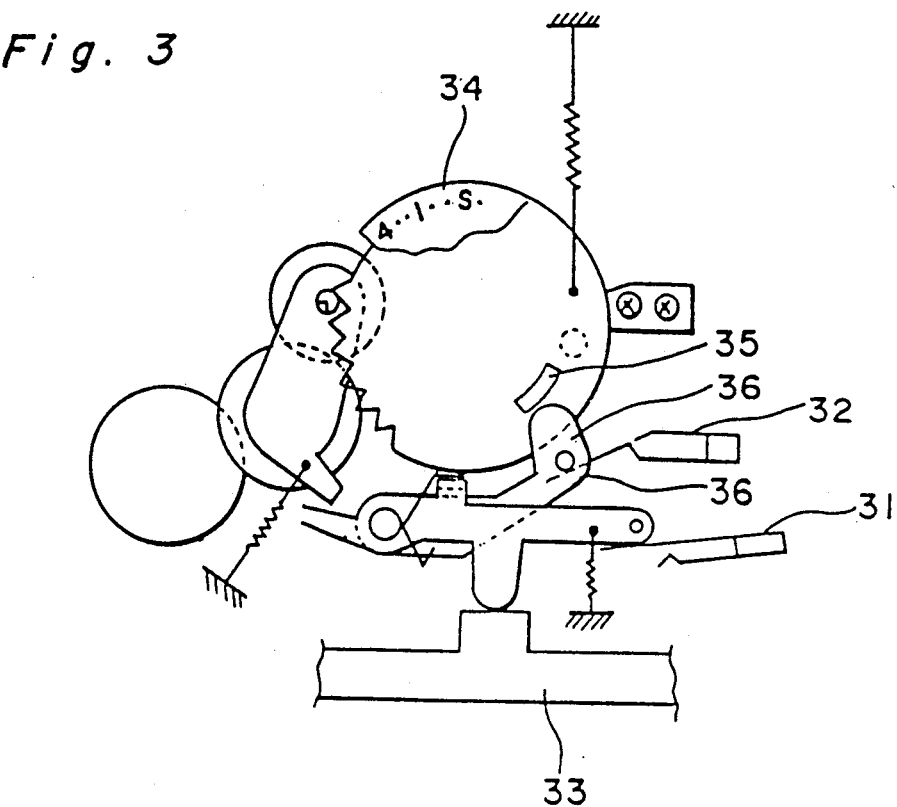
FIG. 3 is a diagrammatic view showing a mechanism of a frame-number counter.

As shown in FIG. 3, within the camera body 1, there is provided a back-lid detecting switch 31 adapted to be opened and closed when a back lid 33 of the camera is closed and opened, respectively, and a counter switch 32 associated with a film counter 34. The counter switch 32 is selectively closed and opened by a lever 36, driven by a cam 35, and is closed when the count of the film counter shows a value within the range of S to 1 and it is opened when it shows a value more than 1.

Figure 4A:
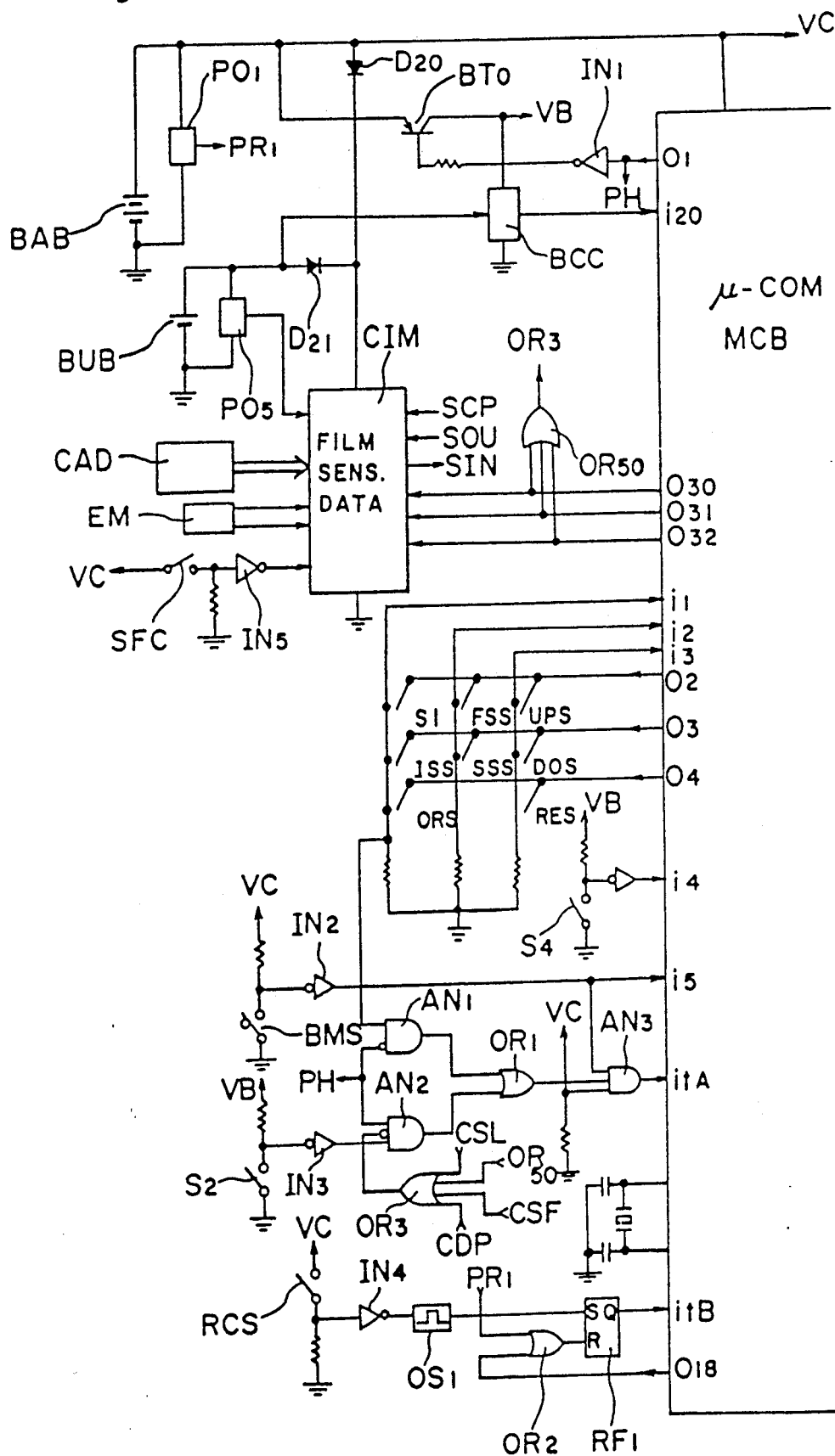
FIGS. 4a and 4b, taken together as shown in FIG. 4, show a circuit diagram employed in the camera system of FIG. 1.

FIG. 4a illustrates a circuit diagram of the entire camera system embodying the present invention. Reference character PO1 represents a power-on reset circuit provided with a battery power source BAB and adapted to output a power-on reset signal from a terminal PR1 when the supply of electric power from a power line VC is reinitiated.

Reference character MCB represents a microcomputer for controlling the operation of the entire camera system. The operation of this microcomputer MCB is shown in the flow charts of FIGS. 7 to 10 and FIGS. 11a to 11h. Reference numeral S1 represents a light measuring switch adapted to be closed upon the halfway depression of the release button 2. Reference character ISS represents a switch adapted to be closed upon the depression of the ISO mode key, and reference character ORS represents a switch adapted to be closed upon the depression of the override key 11. Reference characters FSS and SSS represent respective switches adapted to be closed upon the depression of the aperture value setting key 5 and the exposure time key 6. Reference characters UPS and DOS represent switches adapted to be closed upon the depression of the up-shift key 7 and the down-shift key 8, respectively. Reference numeral RES represents a switch adapted to be closed upon the depression of a recall button 12. These switches are constituted in a key-matrix with output terminals O2, O3 and O4 and input terminals i1, i2 and i3 of microcomputer MCB, and the one(s) which is(are) closed can be determined by microcomputer MCB.

Microcomputer MCB is such that, when it is not operated, output terminals O2, O3 and O4 are "High" and a line connected to input terminal i1 is input to an interruption terminal itA through an AND circuit AN1, an OR circuit OR1, and AND circuit AN3. Accordingly, when one of the light measuring switch S1, the ISO switch ISS and the override switch ORS is closed, interruption is effected to terminal itA and microcomputer MCB is then started.

Reference character BMS represents a main switch. When this main switch BMS is opened, an inverter IN2 produces a "Low" output, thereby placing the microcomputer in an inoperative condition. Furthermore, AND circuit AN3 is held in a disabled state and no interruption signal is input to terminal itA, with the microcomputer consequently not started. In addition, when battery BAB is removed to provide no power supply to line VC, AND circuit AN3 is again held in a disabled state, thereby effecting no interruption. Accordingly, when battery BAB is not loaded or when main switch BMB is opened, microcomputer MCB remains inoperative.

Switch S2 is a switch adapted to be closed upon the full depression of release button 2. When this release button switch S2 closes, inverter IN3 produces a "High" output and an interruption signal is input to terminal itA through AND circuit AN2, OR circuit OR1 and AND circuit AN3. When this interruption signal is input, and when a shutter charge is completed and the calculation of exposure control data is also completed, an exposure control operation is immediately carried out. It is, however, to be noted that, so long as the microcomputer is carrying out a data exchange with other circuits, OR circuit OR3 produces a "High" output, causing AND circuit AN2 to be disabled. Thus, the interruption by release button switch S2 will not take place.

A switch RCS is a back lid switch (corresponding to switch 31 in FIG. 3) adapted to be opened and closed when the camera back lid 33 is opened and closed, respectively. Accordingly, when the back lid is closed, the output of an inverter IN4 becomes "High" and a pulse is output from a one-shot circuit OS1 to set a flip-flop RF1, with an interruption signal consequently input to a terminal itB. Then, microcomputer MCB performs an operation which is to be performed when the back lid is closed. After this operation has been performed, a pulse is output from a terminal O18 to reset flip-flop RF1 thereby establishing the inoperative condition of microcomputer MCB.

Reference character LE represents an interchangeable lens assembly which is electrically connected to the camera body through connectors CNF and CNB1 so that fixed data stored in a circuit LEC inside the lens assembly, such as an aperture value, can be serially applied to microcomputer MCB through an interface circuit BOL (FIG. 4a). This operation causes microcomputer MCB to produce a "High" output from terminal O5. Then, when a serial-in and serial-out command are executed, eight clock pulses are output from a serial clock pulse terminal SCP. In synchronism with these clock pulses, data from the lens assembly LE are input and are read in from a serial input terminal SIN. By repeating this serial input command a number of times, necessary data from the lens LE can be all read in.

Reference character CAD represents a code pattern circuit for outputting data of the code pattern provided on the film cartridge 14. Reference character EM represents a code plate for outputting data corresponding to a selected exposure control mode, and reference character SFC represents a counter switch (corresponding to that shown by 32 in FIG. 3) adapted to be closed when the film counter is in a preparatory winding position, but opened when it is in a photo-taking position.

Figure 5:
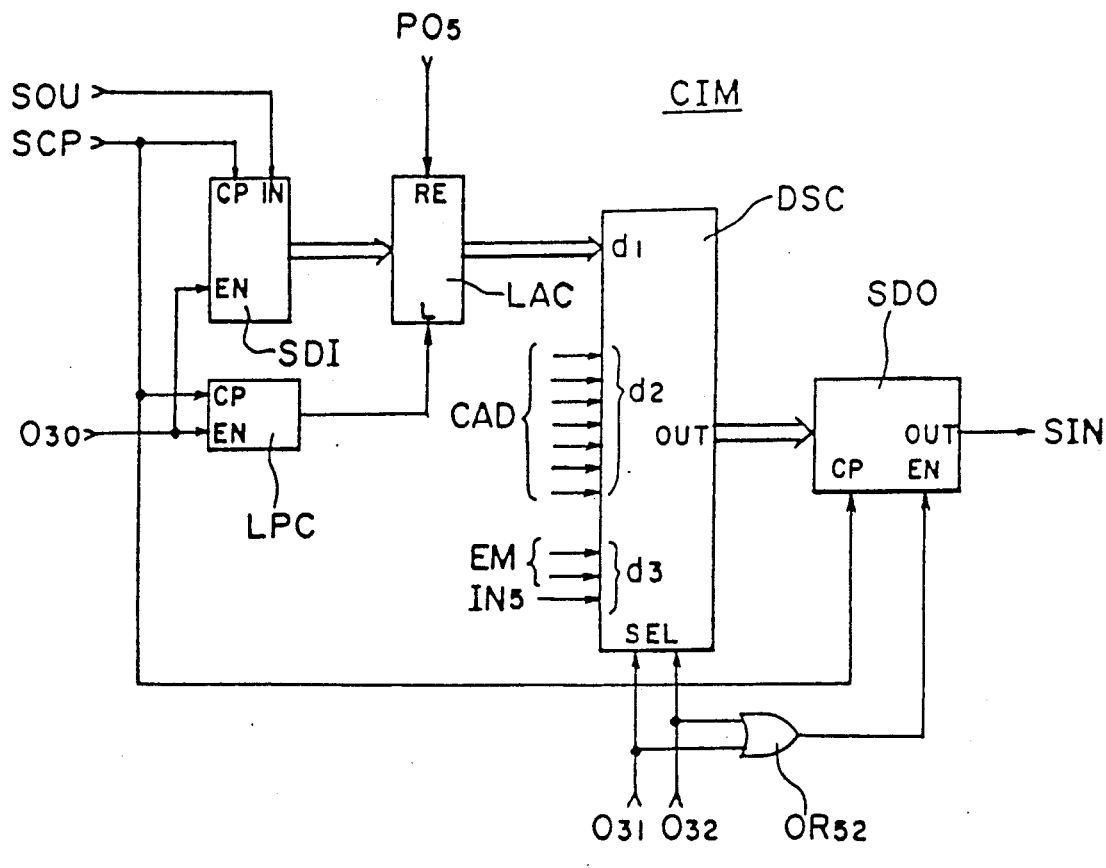

Reference numeral BUB represents a back-up battery in FIG. 4a. Reference character CIM is a circuit for storing the ISO data, and for reading data CAD from the film cartridge, mode data and a signal from the film counter switch SFC, the details of which are shown in FIG. 5. This circuit CIM is powered by the back-up battery BUB through a diode D21 and is also powered by the main battery BAB through diode D20. Reference character BCC represents a circuit for checking the output voltage of the back-up battery BUB and is powered by a power line VB through a transistor BTO such that, when the output of the back-up battery BUB is higher than a predetermined value, BCC generates a "High" signal to a terminal i20. Reference character PO5 represents a power-on reset circuit capable of outputting a reset signal when the back-up battery is loaded. The reset signal is fed only to an ISO data storage register within the circuit CIM, the content of that register being reset only when the back-up battery BUB is loaded. Terminals O30, O31, O32 are terminals for producing signals that control the operating mode of the circuit CIM. In the circuit CIM, an operation corresponding to output from these terminals takes place. An OR circuit OR50 receives signals from these terminals O30, O31 and O32, and its output terminal is connected to one input terminal of OR circuit OR3. Accordingly, when data transmission is effected between circuit CIM and microcomputer MCB, interruption to terminal itA by release switch S2 is inhibited.

Referring to FIG. 5, reference character SD1 represents a circuit for reading, in synchronism with the clock pulses from a terminal SCP, data which are serially input from a terminal SOU of microcomputer MCB. A counter LPC which operates when terminal O30 is "High", counts the number of synchronizing clock pulses and outputs a latch pulse when it has counted eight clock pulses. This latch pulse is fed to a register LAC and, when this pulse is input, data from the reading circuit SD1 are latched. Register LAC is adapted to be reset by a pulse fed from the power-on reset circuit PO5 shown in FIG. 5.

Reference character DSC represents a data selector. Its operation is such that, when the signal from terminals O31 and O32 is "01", ISO data stored in the register LAC, as applied to an input section d1 is produced. When the signal from terminals O31 and O32 is "10", the data on the film container as applied to an input section d2 is produced. When the signal from terminals O31 and O32 is "11", the data representative of the selected mode and the counter switch as applied to an input section d3 are produced. Also, when the signal from terminals O31 and O32 is "00", the data selector DSC produces no data. A serial data output circuit SDO sequentially, serially outputs, when the output of an OR circuit OR52 becomes "High", data from the data selector DSC to terminal SIN on the basis of the synchronizing clock pulses.

Figures 6, 14A, 14B:
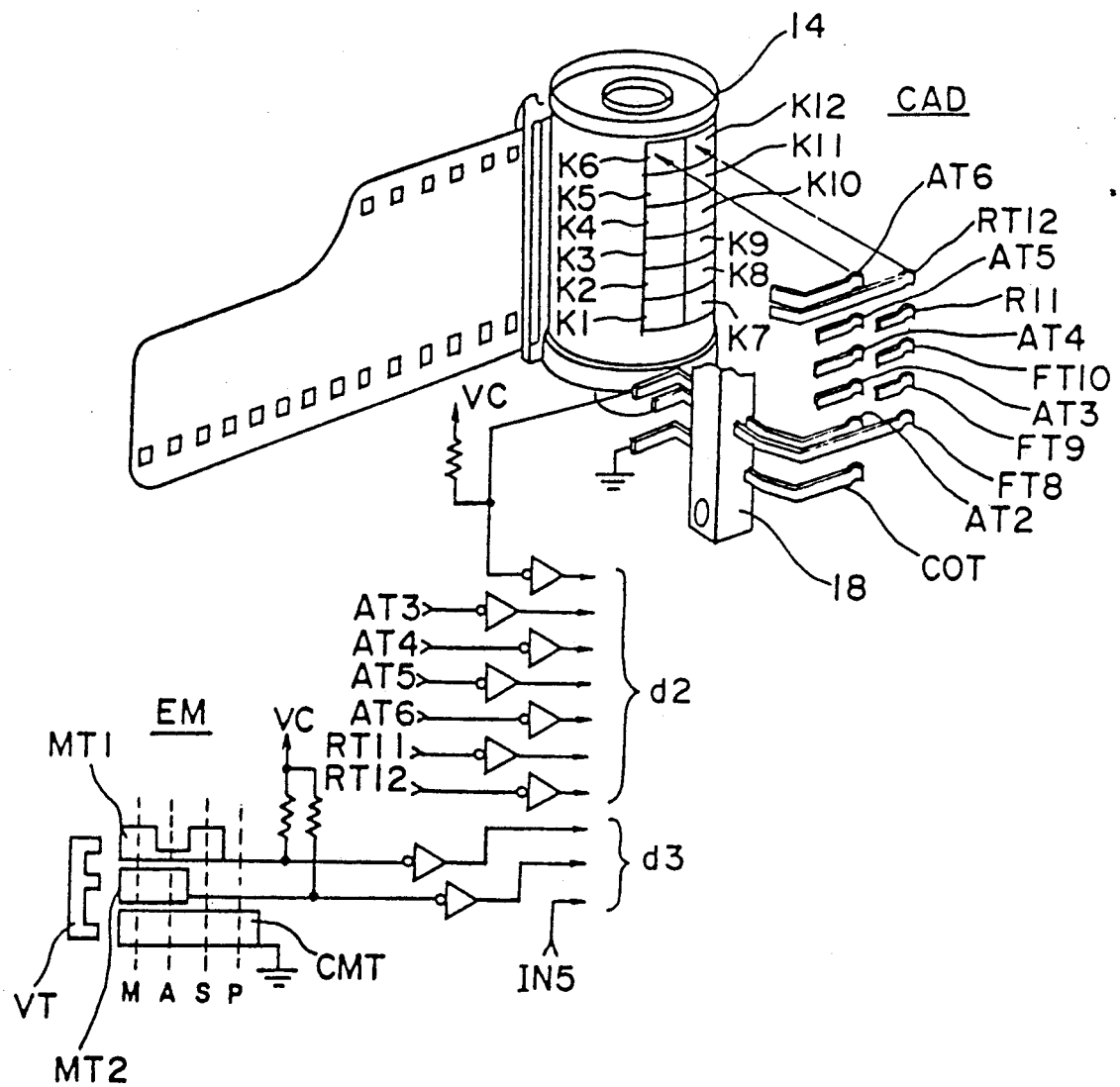

The details of each of CAD and EM are shown in FIG. 6. Referring now to FIG. 6, the film cartridge 14 is provided with code patterns K1 to K12. Portions K1 and K7 are always formed with electrically conductive material regardless of the type of film cartridge and, in the illustrated embodiment, an electrode COT connected to the ground contacts them. Portions K2 to K6 are provided with conductive and non-conductive patterns according to the data corresponding to the ISO sensitivity of a film within the film cartridge 14, an example of which is shown in Table 1.

Contact pieces AT2 to AT6 contact portions K2 to K6, respectively, and are connected to input terminal d2 of data selector DSC, shown in FIG. 5, through pull-up resistors and inverters. Portions K8 to K10 are provided with code patterns corresponding to the data of the number of frames of the film contained in the film cartridge 14. Although contact pieces FT8, FT9 and FT10 contact these portions, data from these contact pieces are not input anywhere because, in the illustrated embodiment, these data are not utilized.

Portions K11 and K12 are provided with exposure range data.

Contact pieces RT11 and RT12 contact these portions K11 and K12 for supplying data on portions K11 and K12 to input terminal d2 of data selector DSC through pull-up resistors and inverters.

Reference characters MT1, MT2 and CMT represent data output code plates for producing data which represents various exposure calculation modes. A slide member VT is moved in accordance with the movement of the mode changeover switch 3. When slide member VT is moved to the P position representing the programmed mode, data "00" are applied to input terminal d2 of data selector DSC. When slide member VT is moved to the S position representing the exposure time priority mode (hereinafter referred to as S mode), data "01" are applied to input terminal d2. When slide member VT is moved to the A position representing the aperture priority mode (hereinafter referred to as A mode), data "10" are applied to input terminal d2. When slide member VT is moved to the M position representing the manual mode, data "11" are applied to input terminal d2. In addition to these data, a signal from film counter switch SFC through an inverter IN5 is also applied to input terminal d2 of data selector DSC.

Referring back to FIG. 4b, reference character FL represents a flash device in which a power source battery BAF, a firing and control circuit FLC and a main switch FMS are incorporated. Flash device FL is provided with a connector CNF which, when flash device FL is mounted on the camera body, is electrically connected with a connector CNB2 for effecting signal transmission between the flash device and a control circuit FCC so as to control the flash device.

Reference character LMC represents a light measuring circuit. The result of the light measuring as effected by light measuring circuit LMC is applied to an analog input terminal ANI of the microcomputer. The microcomputer also receives a reference potential for the digital-to-analog conversion at its terminal VR1. Reference character DPC represents a display circuit operable to drive both a liquid crystal display section LDP for the data display and a light emitting diode FLD for the display of flash photography. Display circuit DPC receives display data from a terminal SOU during a period in which the output of a terminal O10 is "High" and effects the display based on this data. The details of the display section will be described later in connection with FIG. 12. Reference character RLC represents a release circuit which releases the engagement of an exposure control mechanism based on a pulse from a terminal O12.

Reference character APC represents an aperture control circuit operable to read data of the number of f-stop positions to be stopped down, which are fed from terminal SOU during a period in which a terminal O13 is "High", and to interrupt the stopping-down of the aperture of the camera to determine the aperture opening when the data so read coincides with the number of f-stop positions actually stopped down. Reference character TIC represents an exposure time control circuit operable to read exposure time control data output from terminal SOU during a period in which a terminal O14 is "High" and to initiate a shutter closing operation after a time corresponding to the data so read has passed since the closure of the count switch S3. Furthermore, a terminal TIE becomes "High" when a release signal RLS is output, and becomes "Low" after a predetermined time, for example, 50 milliseconds, has passed subsequent to the initiation of the shutter closing operation.

With reference to the flow chart shown in FIG. 7, and FIG. 4a the operation of this system will now be described. When the power is initiated from a terminal VC, the microcomputer MCB is activated and performs an initial resetting operation. Also, by the power-on reset signal PR1, the flip-flop RF1 is reset and the display circuit DPC actuated by power from terminal VC is also reset.

Microcomputer MCB produces "High" signals from terminals O1 to O4 and "Low" signals from terminals O5 to O18 at step #0. In addition, it produces a "High" at terminal O31 a "Low" from terminals O30 and O32 to perform the serial input and output operation. Thereupon, the data on the film cartridge from detector CAD are read in register IOR through circuit CIM which data are in turn set in a register CAR. The method of setting the data in register CAR is shown in Table 3 at the end of the specification.

Subsequently, when microcomputer MCB produces "High" signals from its output terminal O32, the serial input and output reading is performed, thereby serially reading the ISO data stored in a register LAC. The ISO data so read out are then set in a register MER. Then, a decision is made in order to determine if input terminal i20 is "High". If it is "High", it means that the output voltage of the back-up battery BUB is sufficient. Then, a further decision is made to determine if the data read out from the register LAC are normal. This decision is such that, unless all of the bits are "0", the data so read out are determined normal. Thus, if the back-up battery is normal and the data from the register LAC are normal, data MER read out from the register LAC are set in a register SVR and interruption to terminals itA and itB is enabled with the program flow proceeding to step #3.

However, if the output voltage of the back-up battery BUB is determined lower than the predetermined value at step #1, or if the result of the determination at step #2 indicates that the normal data are not read out from the register LAC, the program flow proceeds to step #4. At step #4, a decision is made in order to determine, by examining the contents of register CAR, whether the data from the film cartridge are read in. If the result of the determination is yes, that ISO data based on the data from the film cartridge are set in the register SVR, and if it is no, fixed data (for example, ISO 100 Sv=5) are set in the register SVR. Then, the contents of the register SVR are set in an input/output register IOR. Then, terminal O30 is "High" and, thereafter, the serial input and output reading is performed. Thus, the contents of the register SVR are transferred to a storage register LAC. Subsequently, bits MDR0 and MDR7 are set to be "1" and the remaining bits are set to be "0". Register MDR is the register in which data indicative of display methods are set, the weight of each bit being as follows.

A bit MDR0 is "0" when neither a symbol ISO nor a symbol SS is displayed, but becomes "1" when the symbol ISO or SS is displayed. MDR1 is "1" when the exposure time is to be displayed at the display section, but becomes "0" when the ISO data is displayed. MDR2 and MDR3 are "01" and "10" if override data are on a "+ side" and a "− side", respectively, when the override data is to be displayed. When the override data is 0 and are to be displayed, MDR2 and MDR3 become "11". But, they become "00" when no override data is displayed. Accordingly, when MDR2 and MDR3 are "00", no display concerning the override is effected. When they are "01", a symbol "+/−" of the override is displayed together with "+" preceding the override data; when they are "01", the symbol "+/−" is displayed together with "−" preceding the override data; and when they are "11", the symbol "+/−" is displayed and, at this time, the displayed override data, which is 0, is applied with neither "+" nor "−" preceding such a display "0". It is to be noted that, if MDR2 and MDR3 are "01" and "10", the symbol "+/−" will be displayed even when an exposure control value is displayed.

MDR4 is "1" when an F-value is to be displayed and when "0" it is not displayed. Accordingly, when it is "1", "F" is displayed, but when it is "0", "F" is not displayed. MDR5 and MDR6 are set with a symbol representative of a display manner of the light emitting diode FLD which indicates the state of the flash device. When it is "00", the flash device is not mounted on the camera and the light emitting diode is not lit. When it is "01", it indicates that the flash device is mounted on the camera body and is powered and the blinking takes place at the frequency of 2 Hz. When it is "10", it indicates that the charging of the flash device is completed with the light emitting diode being lit. When it is "11", it indicates the completion of the light adjustment and, in this case, the light emitting diode FLD blinks at the frequency of 8 Hz. MDR7 permits the entire liquid crystal display unit to blink at 2 Hz when it is "1", but it is lit continuously when it is "0".

Then, the contents of the register SVR, blank display data BLD and the contents of the register MDR are transferred to the display section DPC and, at the same time, the terminals O1, O2 and O4 are "Low" to enable the interruption of signals to the terminals itA and itB, and ten seconds is allowed to pass. Accordingly, when the contents of the storage circuit LAC powered by the back-up battery BUB vanish or when the output of the back-up battery BUB is not normal on the occasion when the power source battery BAB for the microcomputer is loaded, the ISO data based on the data on the film cartridge or the fixed ISO data is set, and these data are displayed blinking for ten seconds as a warning. Moreover, since the terminals O2 and O4 are "Low", an interruption signal can be applied to terminal itA only when the ISO switch ISS is closed. Accordingly, no exposure control operation is initiated even when the release button is manipulated. In other words, the shutter mechanism is held in a release-locked condition. In order to escape from this condition, the ISO switch should be manipulated or ten seconds should be allowed to pass.

After the passage of ten seconds, the terminals O2 and O4 are "High" and terminal O1 is "Low" at step #3, and thereafter, data necessary to turn on the display are fed to the display section DPC and a "HALT" condition is then resumed. However, it is to be noted that, when the normal ISO data is read out from the register LAC, this data is set and the program flow immediately proceeds to step #3 with no display consequently taking place.

Figure 8:
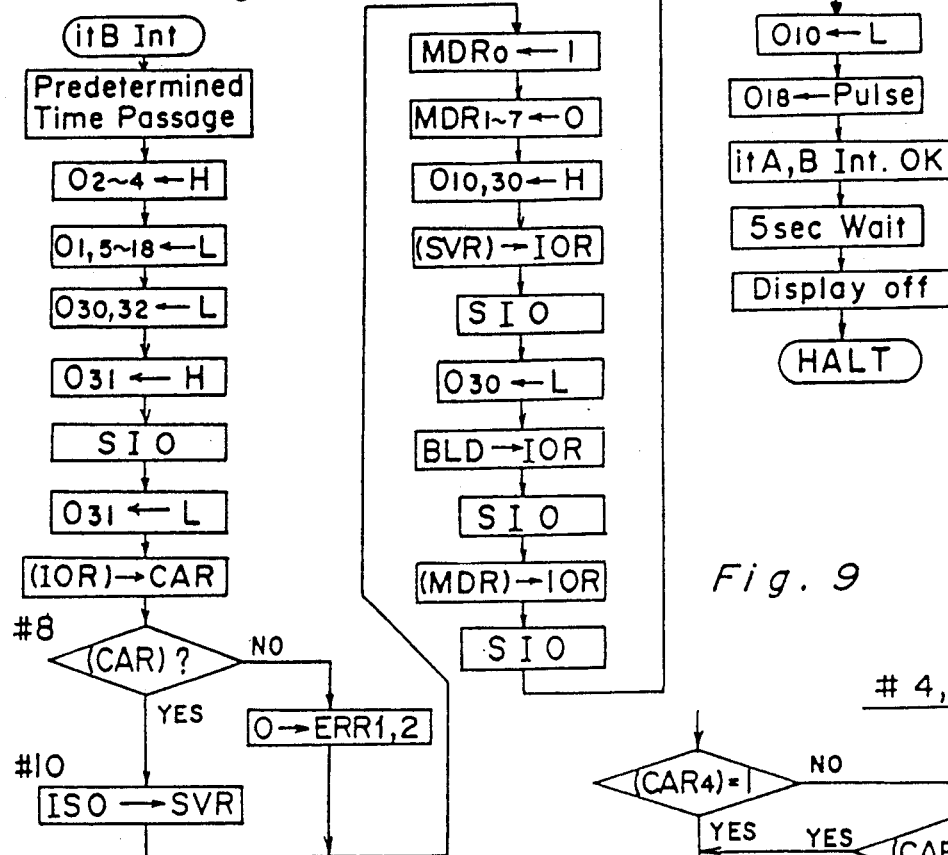
FIG. 8 is a flow chart particularly showing the operation when the back lid is closed.

FIG. 8 illustrates the operation that takes place when the interruption signal is input to terminal itB as a result of the closure of the back cover. At first, a predetermined time (for example, 0.5 sec.) is allowed to pass after the closure of the back cover. This is because, shortly after the back cover has been closed, the film cartridge may undergo a vibratory motion and, therefore, the contact of the feelers 15 and 16 with the film cartridge may not be stabilized. Then, terminals O2, O3 and O4 are "High" and terminals O1, O5 to O18, O30 and O32 are "Low". Furthermore, terminal O31 is "High", and then the serial input and output reading is performed. Accordingly, data are read out from the film cartridge. Subsequently, based on the read data, a decision is made in order to determine if the data is provided on the film cartridge. If the data are provided on the film cartridge, the ISO data based on this data is set in the register SVR, but if it is not provided, the contents of the register SVR remain unchanged.

Thereafter, by rendering the bit MDR0 to be "1" and the remaining bits MDR1 to MDR7 to be "0", the contents of the register SVR, the blank data BLD and the contents of the register MDR are transferred to the display section DPC, thereby displaying the set ISO data. Then, terminal O18 produces a pulse with which the flip-flop RF1 is reset. Then, terminals itA and itB are enabled to receive interruption signals within the next five seconds. After the lapse of the five seconds, the display is turned off with the "HALT" condition established in a manner similar to that effected at step #3.

Figure 9:
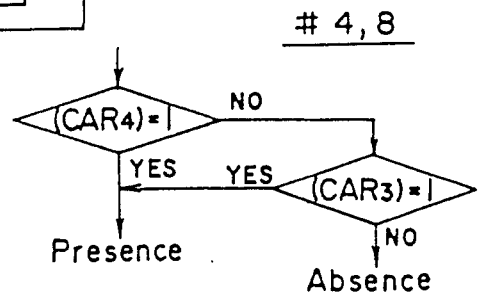
FIG. 9 is a flow chart showing the detailed steps for step #4 of FIG. 7 or #8 of FIG. 8.

The details of detection of the presence of CAR at steps #4 or #8 will now be described with reference to FIG. 9. As shown in Table 1 (at the end of the specification), in the case of the film cartridge provided with the code pattern, at least one of the portions K6 and K5 is a conductive portion. If "1" is read in either one of the bits CAR4 and CAR3 of the register CAR, the film cartridge loaded is regarded as having the code pattern, and therefore, the setting of the data from the code pattern is carried out. However, if both of the bits are "0", it means that the film cartridge having no code pattern is loaded or that no film cartridge is loaded and, in that case, no setting of the data based on the contents of the register is carried out.

Figure 10:
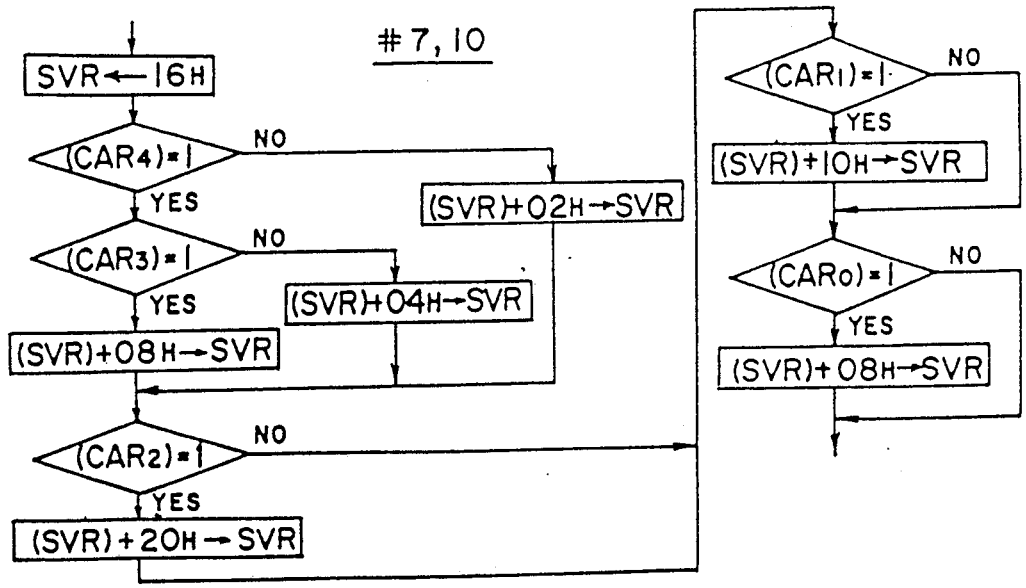
FIG. 10 is a flow chart showing the detailed steps for step #7 of FIG. 7 or #10 of FIG. 8.

The details of the film sensitivity setting operation at steps #7 or #10 will be hereinafter described in connection with FIG. 10. At first, 16H is set in the register SVR, wherein H represents a hexademical number system.

Each of the registers SVR1 and SVR2 has 8 bits, each bit being weighted 16, 8, 4, 2, 1, ½, ¼ and ⅛ from the most significant bit. The film sensitivity is variable by a unit of ⅛ Ev in terms of the APEX value. If a fraction portion of the film sensitivity of the film loaded in the camera is ½ or ⅝, it is approximated to ¼ or ¾ (=½+¼), respectively. Accordingly, 16H set in the register SVR at step #1 corresponds to Sv=2⅜.

Then, if bits CAR4 and CAR5 of the register CAR are "11", 08H, is added to the contents of the register SVR1. Similarly, if CAR4 and CAR5 are "10", 04H is added, and if they are "01", 02H is added. Accordingly, if the bits of the fraction portion are "11", Sv=1 is added to give 1EH with the fraction portion being ¼. However, if the bits of the fraction portion are "10", Sv=½ is added to give 1AH with the fraction portion being ¼. Furthermore, if the bits are "01", Sv=¼ is added to give 18H with the fraction portion being 0.

Subsequently, if the bit CAR2 of the register CAR is 1, Sv=4 is added to the contents of the register SVR1. Similarly, if the bit CAR1 of the register CAR is 1, Sv=2 is added, and if the bit CAR0 is 1, Sv=1 is added.

The foregoing operation will now be described in connection with the case in which the film cartridge with ISO400 film is loaded in the camera. In this case, as shown in Table 1, the portions K4 and K5 are conductive. In the register CAR, the bits CAR3 and CAR2 are "1" while the bits CAR4, CAR1 and CAR0 are "0". Then, 22H is added to the register SVR to give 38H. This data will become 4+2+1=7 according to the weighting system of each bit, which corresponds to the APEX value Sv=7 at ISO400.

The operation of the circuit shown in FIG. 4a will now be described in connection with the flow charts of FIGS. 11a to 11h. When one of light measuring switches S1, ISO switch ISS, and override switch ORS is closed, provided that the power source battery BAB is loaded with the main switch BMS being closed, the interruption signal is applied to terminal itA through the AND circuit AN3 to initiate the operation starting from step #1. At first, a decision is made in order to determine if the content of a flag CCF is "1". This flag CCF will carry "1" when the data for the exposure control is calculated, or will carry "0" when it is not calculated. The operation which will take place when the interruption signal is input to terminal itA while the exposure control value has been calculated will be described later.

When the flag CCF is "0", terminal O1 is "High". Thereupon, a transistor BTO is brought into a conductive state, thereby supplying electric power from the line VB. Also, the AND circuit AN1 is disabled, and the AND circuit AN2 is enabled. Accordingly, a signal from the release switch S2 can be applied to terminal itA as an interruption signal. Then, terminals O3 and O4 are "Low", and terminal O2 is "High", thereby detecting whether terminal i1 is "High" or not. If terminal i1 is "High", interruption takes place as a result of the closure of the light measuring switch S1 and a flag LMF is therefore set to "1" and, at the same time, terminal O2 is "Low". If the switch S1 is held open, and if it is detected at step #13 that terminal i1 is "Low", only terminal O3 is "High". Then, it is determined whether or not terminal i1 is "High". If it is detected as being "High", meaning that the interruption has taken place as a result of the closure of the ISO switch ISS, a flag ISF is set with "1". However, if terminal i1 is "Low", meaning that the interruption has taken place as a result of the closure of the override switch ORS, a flag ORF is set with "1". Thereafter, terminal O3 is "Low" with the program proceeding to step #14.

At step #14, terminal O5 is "High". Then, by repeating the serial input and output operation for a predetermined number of times, the data from the lens assembly LE are read in and the data so read in are sequentially stored in the register LDR. After this operation, terminal O5 is "Low" and terminal O31 and P32 are "High". Thereafter, the serial input and output reading is performed to transfer the mode signal, applied from the code plate EM, and the signal from the counter switch SFC to register MOR. Thereafter, the terminals O31 and O32 are "Low". It is to be noted that the data representing the mode is set in the bits MOR0 and MOR1 while the signal from the counter switch SFC is set in the bit MOR2. In this way, both the condition of the film counter and a signal indicative of the exposure control mode are stored in the register MOR.

Next, when terminal O9 is "High", a pulse having a pulse width of 50 microsecond is output from terminal O8. Then, when data "00H" has been set in the input-/output register IOR, the serial input and output operation is performed. Upon this operation, the data from the flash device FL is loaded in the register IOR, which is in turn stored in the register FDR. Step #15 is performed after terminal O9 is "Low".

At step #15, a signal obtained from the light measuring circuit LMC, indicating the result of measurement of a target object to be photographed, is subjected to the analog-to-digital conversion. Thereafter, in order to eliminate, on the basis of the data from the lens assembly LE, terms of the full aperture value Avo and the full aperture metering error Avc both included in the analog-to-digital converted data, the equation $$(Bv-Avo-Avc)+Avo+Avc=Bv$$

is calculated to give a data of the brightness of the target object. Thereupon, the following equation $$Bv+(SVR)=Ev$$

is calculated to given the exposure value Ev.

Then, a decision is made to determine if the bits MDR2 and MDR3 of the register MDR are "01". If they are "01", it means the override on the "+" side as hereinbefore described and, therefore, the contents of a register ORR1 in which the override data on the "+" side is set is subtracted from the exposure value Ev to give an Ev value. However, if the contents of MDR2 and MDR3 are not "01", a decision is subsequently made of the override on the "−" side and, therefore, the contents of a register ORR2 in which the override data on the "−" side is added to the exposure value Ev to give an Ev value.

Upon completion of the foregoing operation, the program flow proceeds to step #16 at which a calculating operation of the exposure control data takes place. At first, at step #16, a decision is made in order to determine if the P mode has been established. If the P mode has been established, a calculation for the photo-taking in the P mode with the use of an ambient light and a calculation for the photo-taking in the P mode with the use of a flash light are performed, and a flag DCF1 is set to "0", followed by step #18. The flag DCF1 is a flag which will carry "1", when the present aperture value or the present exposure time is changed, but will carry "0" when none of these is changed. In the P mode, since any change of the aperture value or the exposure time will not be accepted, the flag DCF1 is always "0".

If the result of the decision at step #16 indicates that it is not the P mode, the program flow proceeds to step #19 at which another decision is made to find if it is the A mode. If it shows that it is the A mode, a change in the present aperture value is accepted and for this purpose, the operation is performed to effect such change of the data. At first, terminal O2 is "High" and a decision is then made to find if terminal i2 is "High". If terminal i2 is "High", the aperture setting switch FSS is to be closed. Then, a decision is made to find if terminal i3 is "High". If terminal i3 is "High", the up-shift switch UPS is to be closed. In this case, terminal O2 is "Low", and the operation is performed to change the data in a direction towards a smaller aperture. That is, a decision is first made to find if the contents of a register AVR3 in which the preset aperture value data is set is on the side of a larger aperture than the full aperture value data Avo fed from the ROM of the lens assembly LE. If the result of the decision is yes (which occurs when the lens assembly is interchanged), the contents of the register AVR3 is set to Avo with the program flow subsequently proceeding to step #20. However, if the result of the decision is no, that is, if the contents of the register AVR3 is not on the side of a larger aperture than Avo, another decision is made to find if it is equal to Avo. A data dAv from the lens assembly LE, if the contents of register AVR3 are equal to Avo, or ½ if it is not equal thereto, is added to the contents of the register AVR3 and a decision is then made to find if the contents of the register is of a value greater than the maximum aperture value data Avm from the lens assembly. If it is of a greater value, the maximum aperture value Avm is set in the register AVR3 and the program flow proceeds to step #20, but if it is not of a greater value, step #20 immediately takes place. The maximum aperture value data Avm is also fed from the lens ROM.

The data dAv will now be described. The full aperture value Avo takes a different value when the type of the interchangeable lens assembly is changed. Some interchangeable lens assemblies have the full aperture value Avo which can be divided by 0.5 Ev, i.e., in a unit of 0.5 Ev (Avo=0.5, 0.1, 1.5 2.0 . . . ), and others not in a unit of 0.5 Ev (for example, F2.5 (Av=2.64), F3.5 (Av=3.61), F1.8 (Av=1.7) and so on). In the camera body, however, the aperture value to be set is in the multiple of 0.5 Ev, except for the fully opened aperture value. Therefore, in the case where the fully opened aperture is not in the multiple of 0.5 Ev, the first stop-down change from the fully opened aperture value to the next aperture value results in a change dAv which is smaller than 0.5 Ev. Therefore, after the first stop-down change, the aperture value can be set to the multiple of 0.5 Ev, with the aperture change effected at the rate of 0.5 Ev. Accordingly, in the case of the F2.5 lens assembly, dAv=0.36; in the case of the F3.5 lens assembly, dAv=0.39; and in the case of the F1.8 lens assembly, dAv=0.3. This data dAv is also transferred to the camera body from the lens ROM.

If it is determined that terminal i3 is not "High" and, at the same time, the up-shift switch UPS is not closed at the timing when terminal O2 is "High", terminal O2 is "Low", and terminal O3 is "High", thereby making a detection, based on the state of terminal i3, whether or not the down-shift switch is closed. If the down-shift switch DOS is closed, terminal O3 is "Low" and ½ is subtracted from the content of the register AVR3. Then, a decision is made to find if the result of the subtraction is on the side of the fully opened aperture with respect to the fully opened aperture value Avo, if it is of a value on the side of the fully opened aperture, the fully opened aperture value Avo is set in the register AVR3 with the program flow subsequently proceeding to step #20.

At step #20, the flag DCF1 is set to "1" to show that the setting data has been changed, followed by step #21. However, in the case where the aperture switch FSS is not closed, or where both the up-shift and down-shift switches UPS and DOS are not closed, the data will not be changed and the flag DCF1 is set to "0" at step #23, followed by step #21. At step #21, the calculation for the photo-taking under the A mode with the use of the ambient light is performed and, at the subsequent step #22, the calculation for the photo-taking under the A mode with the use of the flash light is performed. Thereafter, the program flow proceeds to step #24.

If it is determined that the mode is other than the A mode at step #19, a decision is made at step #25 to determine if it is the S mode. If it is determined as the S mode, a decision is made at steps #25 and #26 to determine from the state of terminal i2 if the exposure time switch SSS is closed. If the result shows that the exposure time switch SSS is not closed, the flag DCF1 is set to "0" at step #28 followed by step #29. However, if the result of decision at step #27 shows that the exposure time switch SSS is closed, a decision is then made to find if the up-shift switch UPS is closed. If the result of the decision at step #30 shows that the up-shift switch UPS is closed, "1" is added to the content of the register TVR3 in which the present exposure time data is set. Whether or not the result of the addition is greater than the data Tvm is determined at step #31. If the result of the addition is greater than the data Tvm, Tvm is set in the register TVR3, but if it is not greater than that, the content remains unchanged and the flag DCF1 is set to "1" at step #32, followed by step #29.

If the result of the decision at step #30 shows that the up-shift switch UPS is not closed, whether or not the down-shift switch DOS is closed is determined at step #33. If the down-shift switch DOS is closed, "1" is subtracted from the register TVR3 at step #34, and subsequently, a decision is made to determine if the result of the subtraction has a longer exposure time than the maximum exposure time Tvo. If it has the longer exposure time, Tvo is set in the register TVR3, but if not, the content remains unchanged and the flag DCF1 is set to "1". The program flow then proceeding to step #29.

When the exposure time switch SSS is not closed, or when both of the up-shift and the down-shift switches UPS and DOS are closed while the exposure time switch SSS is closed, the flag DCF1 is set to "0" and the program flow proceeds to step #29. At step #29, the calculation for the photo-taking under the S mode with the use of the ambient light is performed, followed by the calculation for the photo-taking under the S mode with the use of the flash light. Then, the program flow subsequently proceeds to step #18.

If it is determined at step #25 that the mode is not the S mode, the mode is the M mode. In that case, both the aperture value data and the exposure time value data can be changed. When both of the aperture value data and the exposure time data have been changed in a manner similar to that described hereinbefore, the calculation for the photo-taking under the M mode with the use of the ambient light and that with the use of the flash light are successively performed. Thereafter, the program flow proceeds to step #18.

At step #18, since the exposure control data has been calculated, the exposure control operation can be carried out and thus, flag CCF is set to "1". Then, the interruption signal can be input to terminal itA or itB at any time. Subsequently, a decision is made based on the data from the flash device FL in order to find if the flash device being powered is loaded. If no loading signal is present, indicating that the flash device is not loaded, the bits MDR5 and MDR6 of the register MDR are made to be "00", and the program flow proceeds to step #35. If, however, the loading signal is present, a decision is then made to find if a signal indicative of the completion of the light adjustment, which signal is hereinafter referred to as FDC signal, is being input. If the FDC signal is input, the bits MDR5 and MDR6 of the register MDR are set to "11" with the program flow then proceeding to step #35. However, if the FCD signal is not input, a decision is then made to determine if a charge completion signal is being input. If the charge completion signal is input, bits MDR5 and MDR6 are set to "10", but if not, they are set to "01".

At step #35, terminal O9 is "High" and, thereafter, the transfer of data from the camera to the flash device FL takes place. At the subsequent step #36, a pulse having a pulse width of 100 microseconds is produced from terminal O8. Then, the ISO data set in the register SVR is set in the input/output register IOR, the content of which is output through a digital-to-analog converter from an analog signal output terminal AN0. Thereupon, by performing the serial input and output operation, the ISO data is transferred to the flash device. Following that, the content of the register AVR2 in which the aperture value data is loaded for the flash photography is loaded in the register IOR and is then transferred to the flash device and, at the same time, the content of the register TVR2 in which is set the exposure time data for the flash photography is set in the register IOR and is then transferred to the flash device. Thereafter, of the data from the lens assembly LE, the content of a register LDRf in which a focal length data is set is loaded in the register IOR and is then transferred to the flash device FL, thereby producing a "Low" signal from terminal O9. In this way, the data from the camera body are transmitted to the flash device. Based on the data so transferred, the flash device performs various functions including the display of the available range and the automatic setting of the lighting coverage angle.

At step #40, a decision is made as to whether the flag ISF is "1". When it is "1" meaning that the ISO switch is closed, the program goes to step #43. However, when it is "0", a decision is made at step #41 in order to determine if the flag ORF is "1". If it is "1", indicating the closure of the override switch ORS, the program flow proceeds to step #44. However, if it is "0", the content of a bit MOR2 of register MOR is determined. If the content of the bit MOR2 is "0", it indicates that the film count switch SFC is closed, but the film counter has not yet reached the position 1 (the first frame number that can be photographed) and, therefore, the program flow proceeds to step #52. If at step #42, it is determined that bit MOR2 of register MOR is "1" meaning that the film counter switch SFC is opened, the program flow proceeds to step #46. At this time, since it is under the mode in which the exposure control value is to be displayed, bits MDR2 and MDR3 are made to be "00" if they are "11", and at the same time, bits MDR1 and MDR4 are rendered to be "1". Accordingly, the symbol "+/−" will not be displayed unless the override takes place, and symbols F and SS are displayed on the display device LDP.

Next, a decision is made to find whether the charge completion signal is being input. If the charge completion signal is input from the flash device FL to the microcomputer MCB, both the exposure time (content of the register TVR2) and the aperture value (content of the register AVR2) for the flash photography are serially transferred to the display section DPC, but if it is not input, both the exposure time (content of the register TVR1) and the aperture value (content of the register AVR1) for the photography under the ambient light are serially transferred to the display section DPC. Thereafter, the program flow proceeds to step #49 shown in FIG. 11e.

If it is determined at step #40 that the ISD switch ISS is closed, step #43 takes place at which a "High" is produced from terminal O2. At step #50, a decision is made in order to determine whether the up-shift switch UPS is closed or not. When the up-shift switch UPS is closed, a decision is further made at the subsequent step #58 in order to determine if a fraction of the ISD data is $\frac{1}{3}$. If it is $\frac{1}{3}$, $\frac{1}{3}$ is added to $\frac{1}{3}$ and the result is placed in the register SVR. But, if it is not $\frac{1}{3}$, $\frac{1}{3}$ is added to that data and the result is placed in the register SVR. Accordingly, the fraction portion becomes $\frac{1}{3}$ if it is 0, $\frac{2}{3}$ if it is $\frac{1}{3}$, or 0 if it is $\frac{2}{3}$. That is, as hereinbefore described, such compromises as $\frac{3}{3} = \frac{1}{3}$, $\frac{3}{3} = \frac{2}{3}$ and 0 = 0 are employed. Then, a decision is made in order to find whether or not the content of the register SVR2 is greater than the maximum ISO data Svm. If the content of the register SVR2 is greater than Svm, Svm is set in the register SVR2, but if it is not, Svm remain unchanged. Thereafter, the program flow proceeds to step #52.

When, at step #50, it is determined that the up-shift switch UPS is not closed, the program flow proceeds to step #53 and #54 at which only terminal O3 is "High". At the subsequent step #55, a decision is made in order to find whether or not the down-shift switch DOS is closed. When the down-shift switch DOS is closed, and if a fraction portion of the manually present data is $\frac{2}{3}$, $\frac{1}{3}$ is subtracted, but when it is not $\frac{2}{3}$, $\frac{1}{3}$ is subtracted. In other words, it is assumed as $\frac{1}{3}$ if the fraction portion is $\frac{2}{3}$, 0 if it is $\frac{1}{3}$, or $\frac{2}{3}$ if it is 0. Then, a decision is made in order to determine if the content of the register SVR is smaller than the minimum ISO data Svo. If the content of the register SVR is smaller than the data Svo, the data Svo is set in the register SVR2, but if it is not, the content of the register SVR remains unchanged. Thereafter, the program flow proceeds to step #52.

In addition, if the result of the decision at step #55 shows that the down-shift switch DOS is not closed, the content of the register SVR remain unchanged and the program flow proceeds to step #52.

At step #52, flag DCF2 is set to "1", and at the same time, bit MDR0 is set to "1" and bits MDR1, MDR4 and MDR7 are set to be "0". Then, the contents of the register SVR are loaded in the register IOR, and "High" is produced from terminal O30, thereby carrying out the serial input and output operation. Thereupon, a newly presented ISO data is fixedly stored in the storage-register LAC (FIG. 5) within the circuit CIM. Subsequently, data necessary to turn off the display section and the ISO data are fed to the display circuit DPC and the program flow then proceeds to step #49.

If at step #41 it is determined that the flag ORF is "1" and the override switch ORS is closed, step #44 takes place. That is, at step #57, a decision is made in order to find whether or not the up-shift switch UPS is closed. If the up-shift switch UPS is closed, bits MDR2 and MDR3 produce "01", and $\frac{1}{3}$ is added to the content of the register ORR1. Then, another decision is made in order to determine whether or not the content of the register ORR1 is above the maximum value ODm. If it is above the maximum value ODm, ODm is set in the register ORR1, but if it is not, the content of the register ORR1 is unchanged and the program flow proceeds to step #58 at which the flag DCF is set to "1". Then, the program proceeds to step #60.

If at step #57 it is determined that the up-shift switch UPS is not closed, step #61 takes place to produce "High" from only terminal O3. Then, the program proceeds to step #62 at which a decision is made in order to determine if the down-shift switch DOS is closed. If the down-shift switch DOS is closed, $\frac{1}{3}$ is added to the contents of the register ORR2 and, if the result exceeds the maximum value ODm, the maximum value ODm is set in the register ORR2, but if it does not exceed the maximum value, the content remains unchanged and the flag DCF2 is set to "1". Then, the program proceeds to step #60.

Figure 11A:
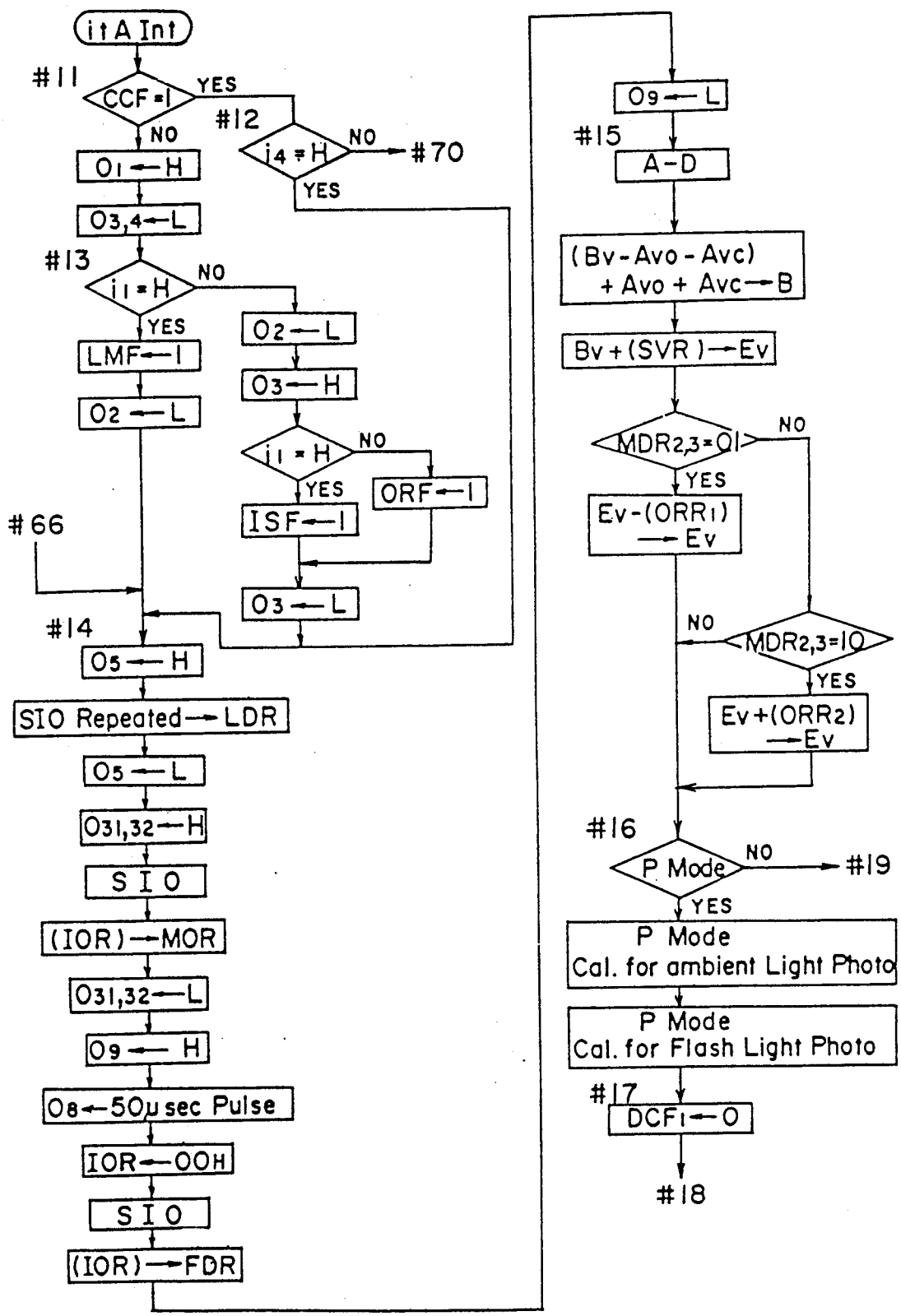
Figure 11B:
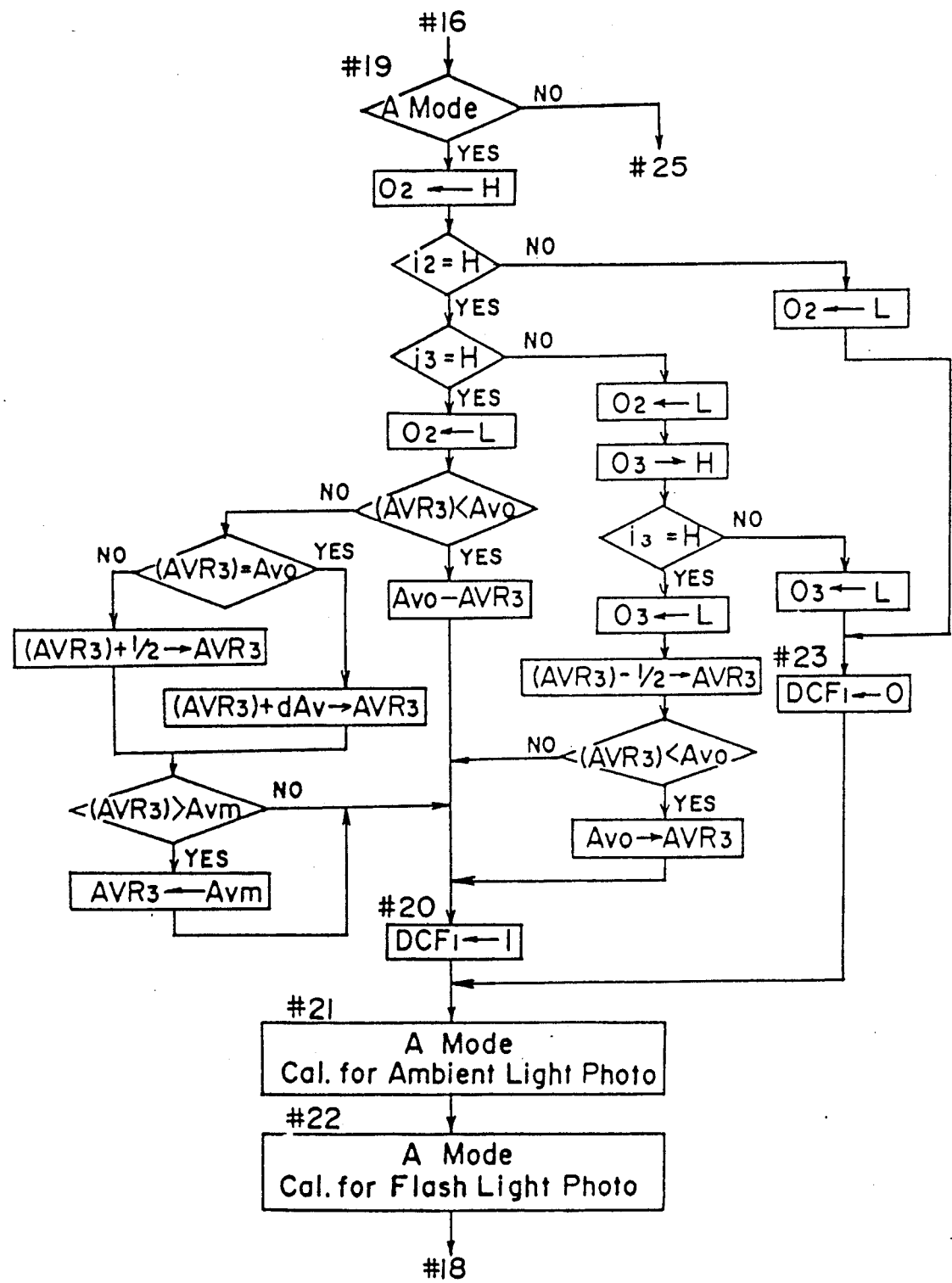
Figure 11C:
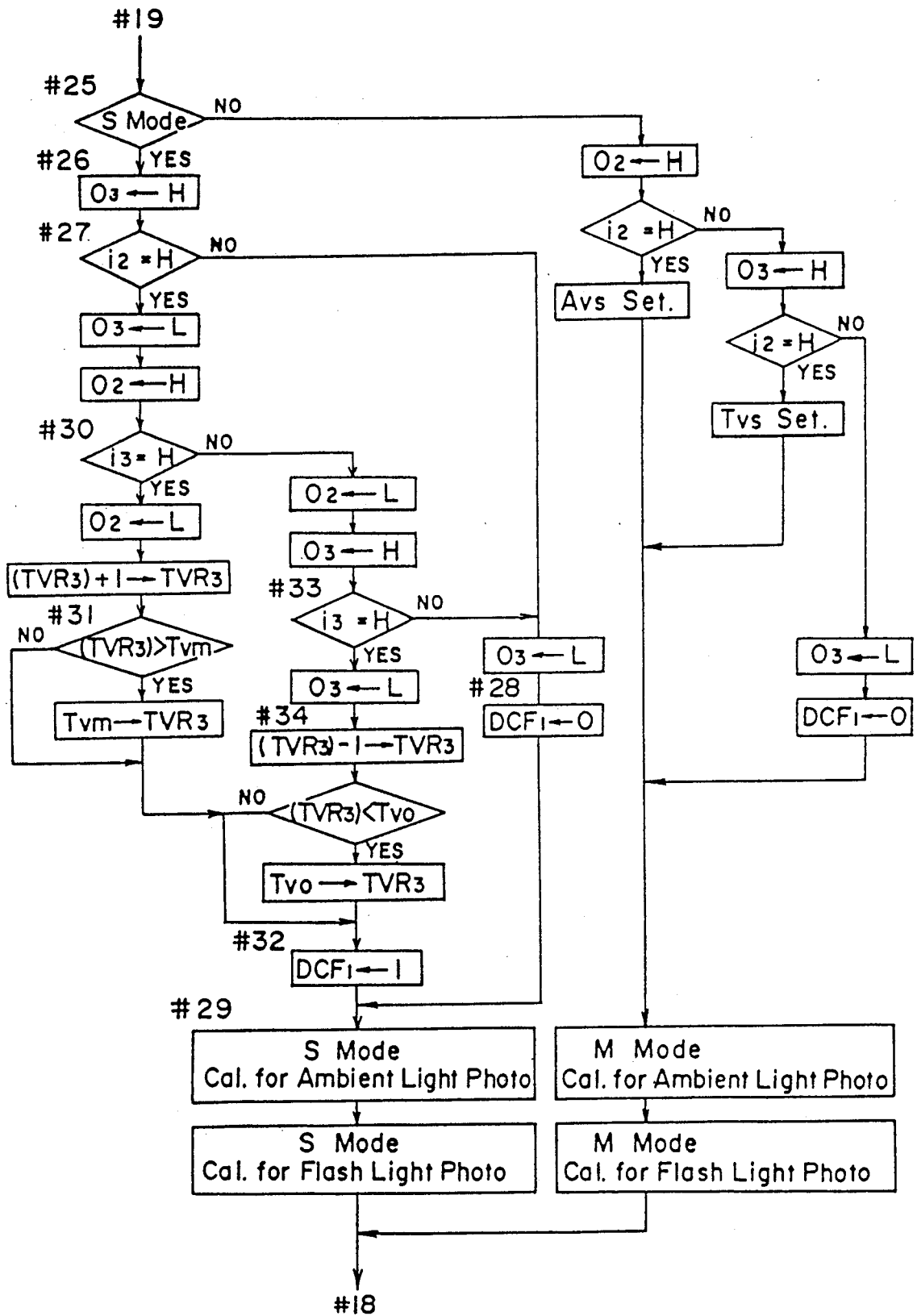
Figure 11D:
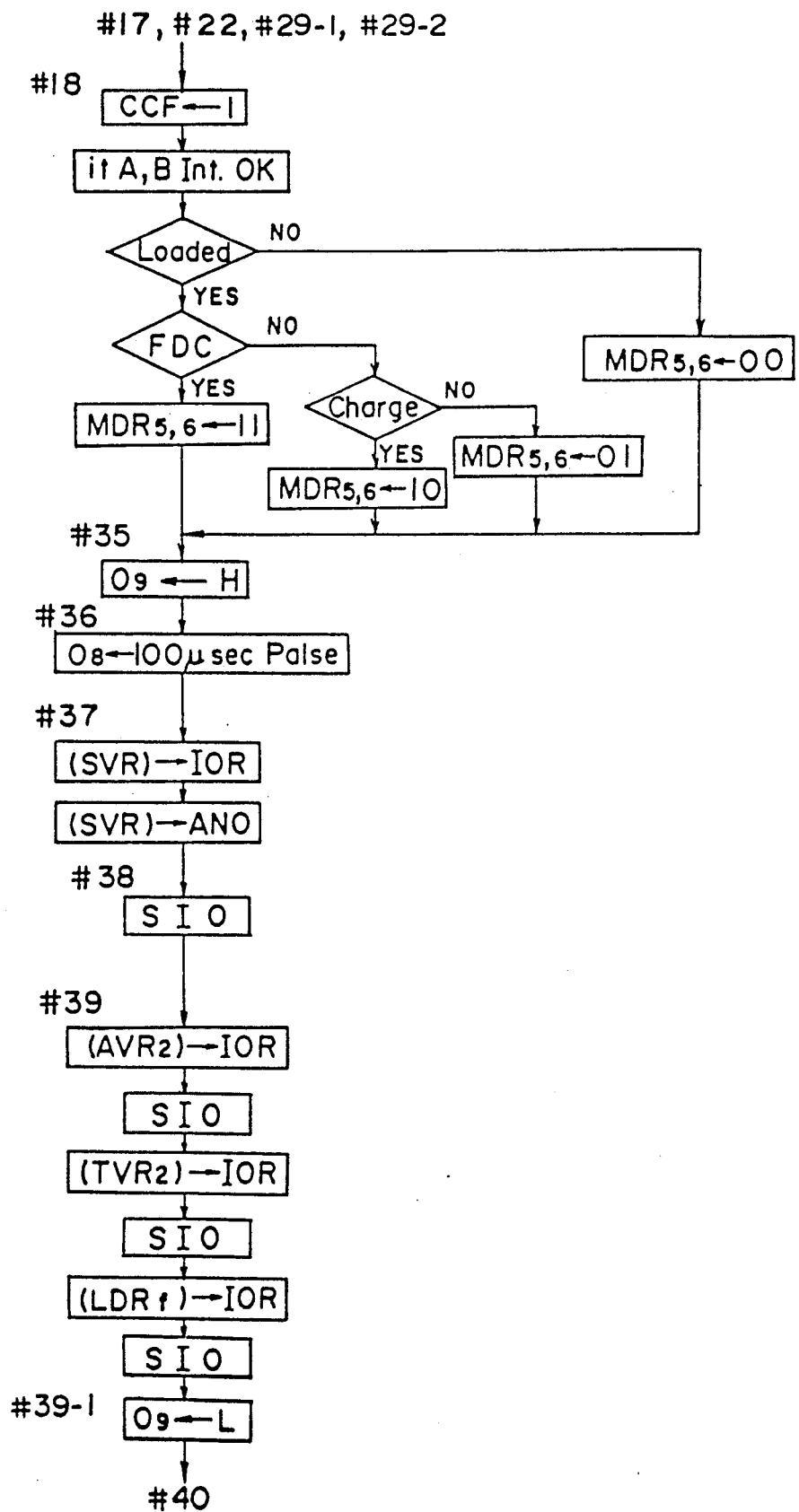
Figure 11E:
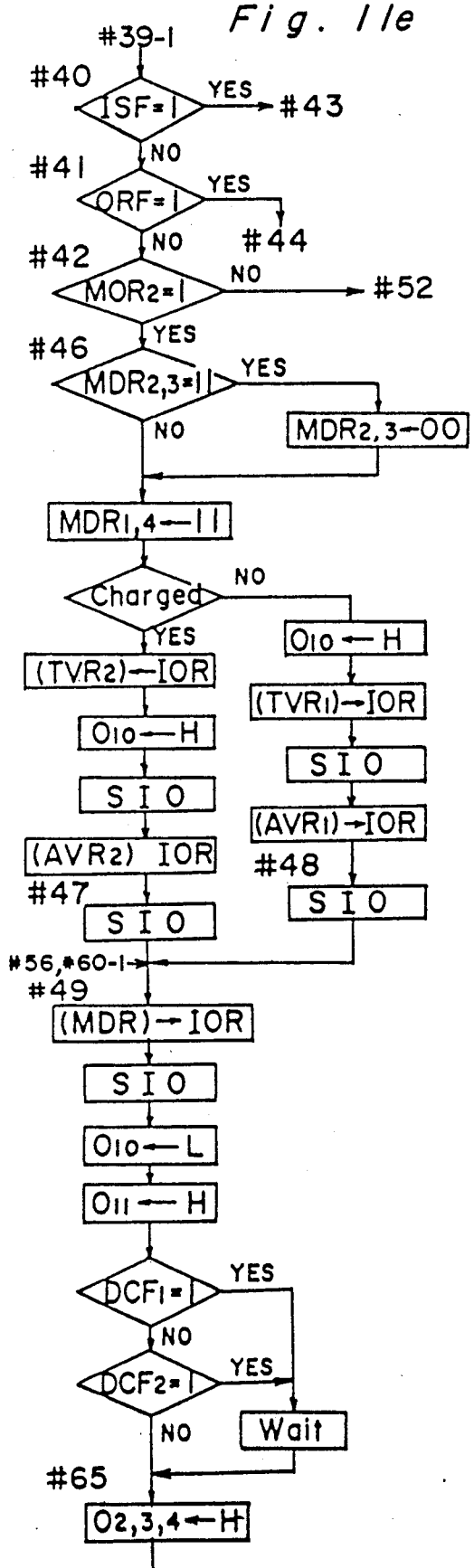
Figure 11E:
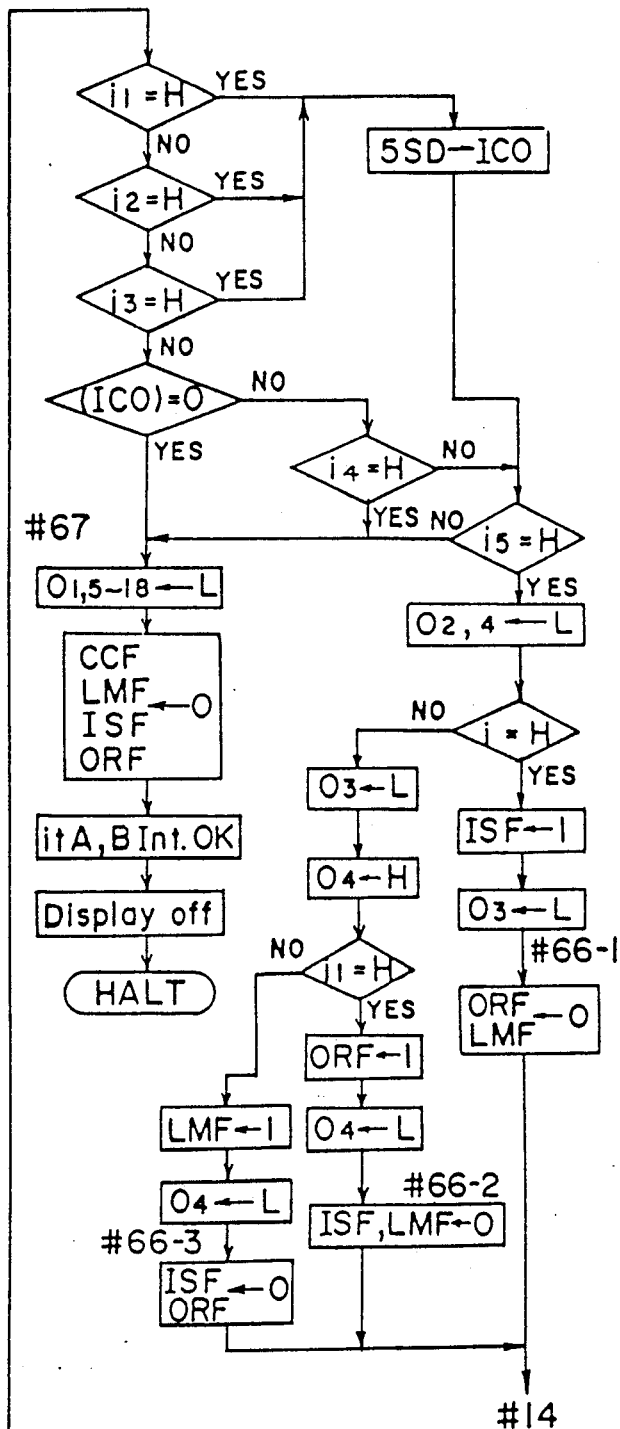
Figure 11F:
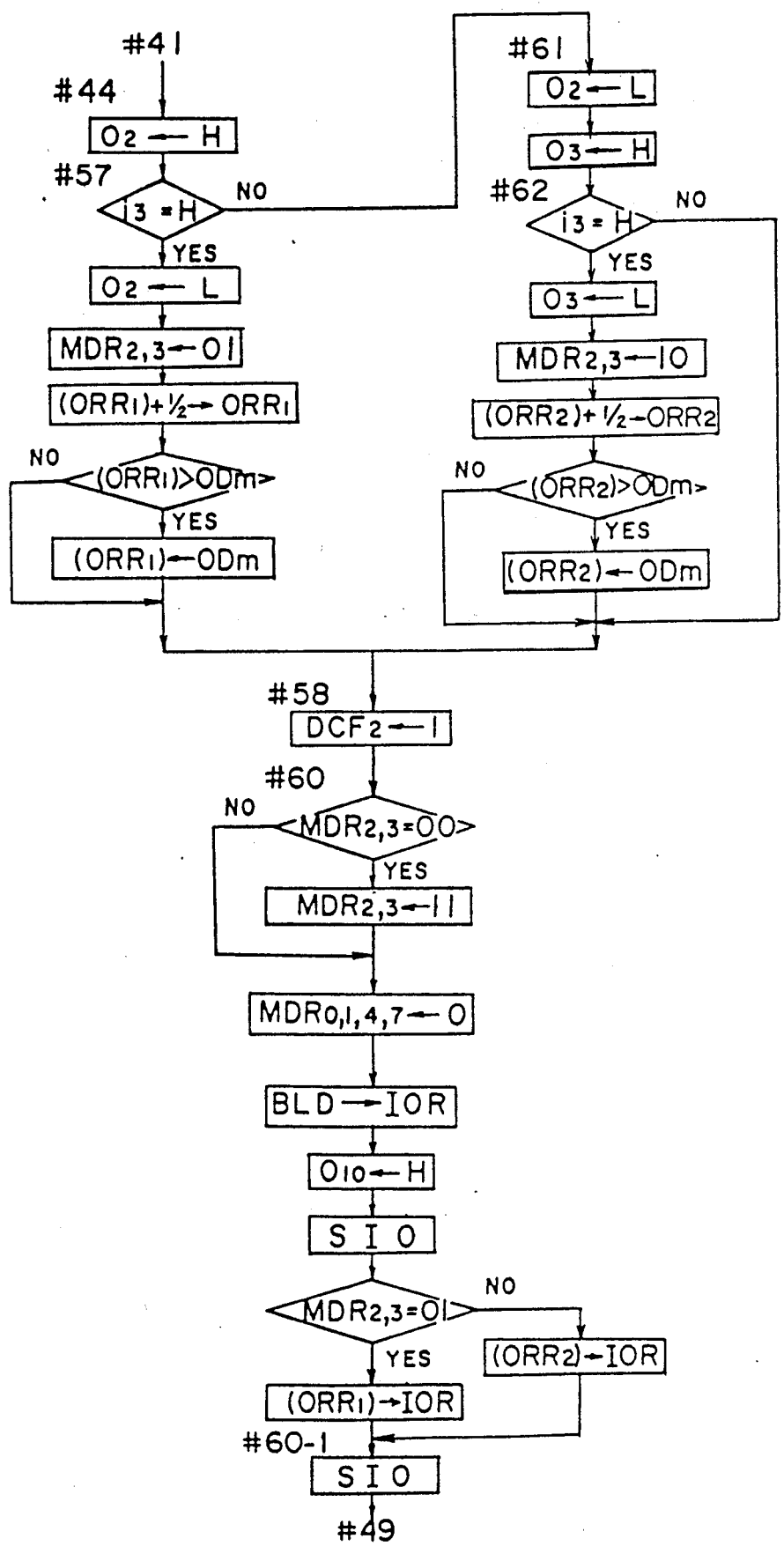
Figure 11H:
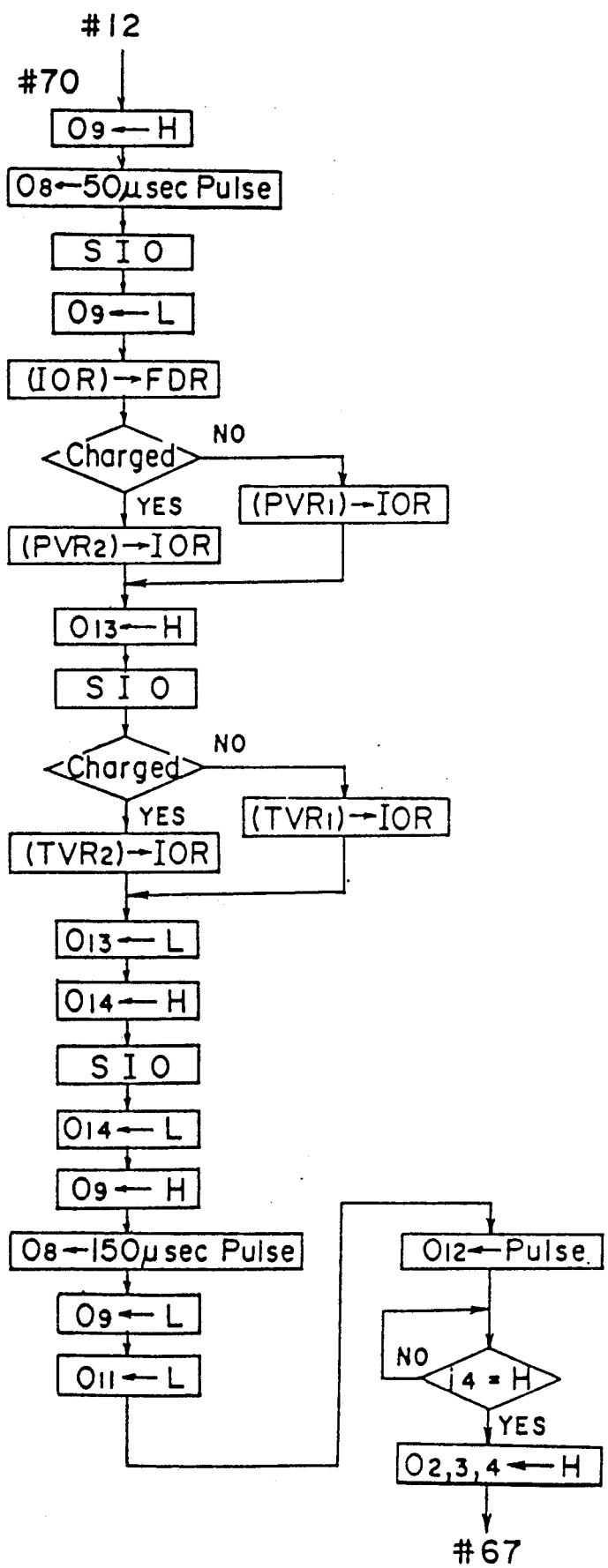

If at step #62 the down-shift switch DOS is not closed, the flag DCF2 is set to "1" without altering MDR2, MDR3 and the registers ORR1 and ORR2, and thereafter, the program goes to step #60 shown in FIG. 11f. At step #60, a decision is made in order to determine if the bits MDR2 and MDR3 of the register MDR are "00". If they are "00", they are changed to "11" for the display. Then, MDR0, MDR1, MDR4, MDR7 are made to be "0". Accordingly, in such case, only the symbol "+/−" for the override is displayed.

Then, the blank data BLD is output to the register IOR and then transferred to the display section DPC to turn off the display of digits indicative of the ISO or SS value. Thereafter, if the contents of MDR2 and MDR3 are "01" indicating that the override is effected on the "+" side, the content of the register ORR1 is transferred to the display section DPC, but if they are not "01", the content of the register ORR2 is transferred to the display section DPC. Then, the program goes to step #49. At step #49, the content of the register MDR is transferred to the display section DPC. Then, the terminal O11 is "High", thereby enabling the display by the light emitting diode FLD in the display section.

Subsequently, a decision is made to determine if either one of the flags DCF1 and DCF2 is "1". If either one is "1", it indicates that the data has been changed. In that case, in order to prevent the data from being changed at a high speed, a predetermined time lapses, and then the program proceeds to step #65. However, if both of the flags DCF1 and DCF2 are "0", step #65 is carried out immediately. At step #65, the terminals O2, O3 and O4 are "High". Then, it is detected whether or not the terminals i1, i2 or i3 are "High", that is, whether or not at least one of the key switches is closed, is determined. If any one of the key switches is closed, a data representing five seconds is set in an internal counter ICO. Then a decision is made to determine if the main switch BMS is closed. If the main switch BMS is closed, the terminals O2 and O4 are "Low" and a decision is then made to determine if the switch ISS has been closed. If the switch ISS is closed, the flag ISF is set to "1", and at the same time, the flags ORF and LMF are set to "0". Then, the program returns to step #41. However, if the switch ISS has not yet been closed, a decision is further made as to determine if the switch ORS is closed. When it is determined that the switch ORS is closed, the flag ORF is set to "1", and at the same time, the flags LMF and ISF are set to "0". Then, the program returns to step #14. Where both of the switch ISS and ORS are opened, the flag LMF is set to "1" and the program flow then returns to step #14. Accordingly, during a period of five seconds in which none of the switches is closed, the exposure time and the aperture values are displayed.

If none of the key switches is closed, a decision is made as to determine if the content of the internal counter ICO is "0". If it is "0", the program flow proceeds to step #67, but if it is not "0", a decision is then further made as to find if the reset switch S4 is closed. If the reset switch S4 is not closed, the state of the main switch BMS is determined. The program then returns from step #66 to step #14.

After the lapse of five seconds subsequent to the opening of all of the key switches, or at the moment when the reset switch S4 is closed or when the main switch BMS is opened, the program goes to step #67, thereby producing a "Low" from the terminals O1 and O5 to O18, and also then, the flags CCF, LMF, ISF and ORF are set to "0", and in turn the interruption by means of the terminal itA or itB is enabled. And the program advances to turn off the display in a manner similar to the operation at step #3 et seq. Then, the "HALT" condition is established.

When the release switch S2 is closed while the calculation of the exposure control value has been completed to set "1" in the flag CCF, interruption to terminal itA is accepted, and thereafter, the program proceeds to step #70. At step #70, terminal O9 produces a "High" and the pulse of 50 microseconds in duration is output from terminal O8 to permit the data to be read from the flash device. A decision is then made to determine if the charge completion signal is input. If it is input, the content of a register PVR2 in which the value of the number of f-stop positions to be stopped down for the flash photography is set, is transferred to the aperture control circuit APC. But if it is not input, the content of a register PVR1 in which the value of the number of f-stop positions to be stopped down for the photography under the ambient light is set, is transferred to the aperture control circuit APC. Thereafter, a decision is made to determine again if the charge completion signal is input. If it is input, the content of the register TVR2 in which the exposure time for the flash photography is set, is transferred to the exposure time control circuit TIC. But if it is not input, the content of the register TVR1 in which the exposure time for the photography under the ambient light is set, is transferred to the exposure time control circuit TIC.

Then, when the terminal O9 is "High", a pulse of 50 microsecond in duration is transmitted from the terminal O8 to the flash device FL. Accordingly, the flash device can detect that the exposure control operation has been initiated. Thereupon, terminal O11 is "Low" to turn off the light emitting diode FLD so that no lighting display will take place during the exposure control. Subsequently, a pulse is output from terminal O12 to cause the release circuit RLC to effect a shutter release operation thereby to initiate the exposure control operation. Then, time lapses until the reset switch S4 closes in response to the completion of opening of the shutter curtain, which is effected after the completion of the exposure control operation. When the reset switch S4 is so closed, the terminals O2 to O4 is "High". Then, the program returns to step #67, thereby to repeat the previously described operation before the "HALT" condition is established.

Figures 4, 4B:
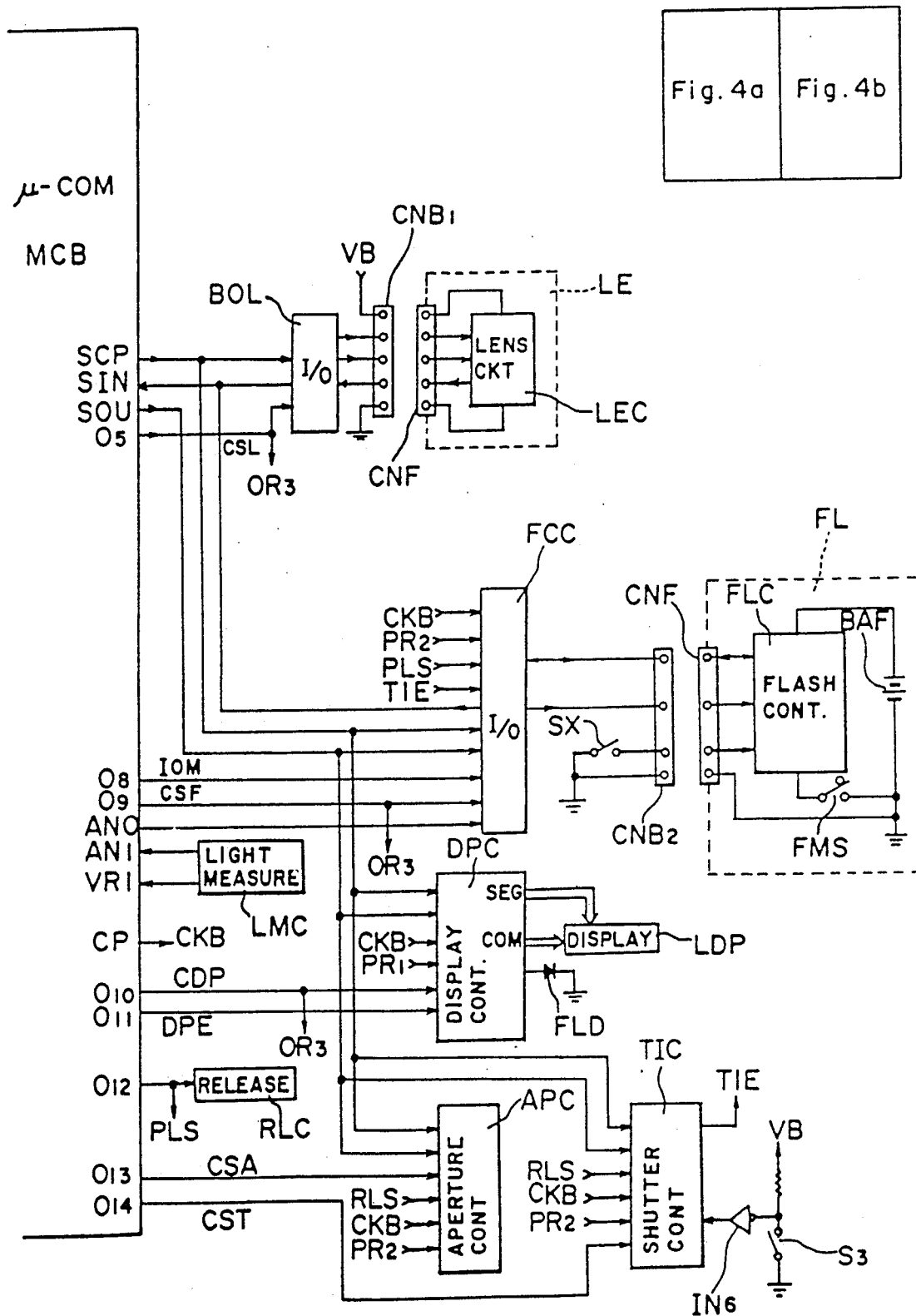
Figure 12:
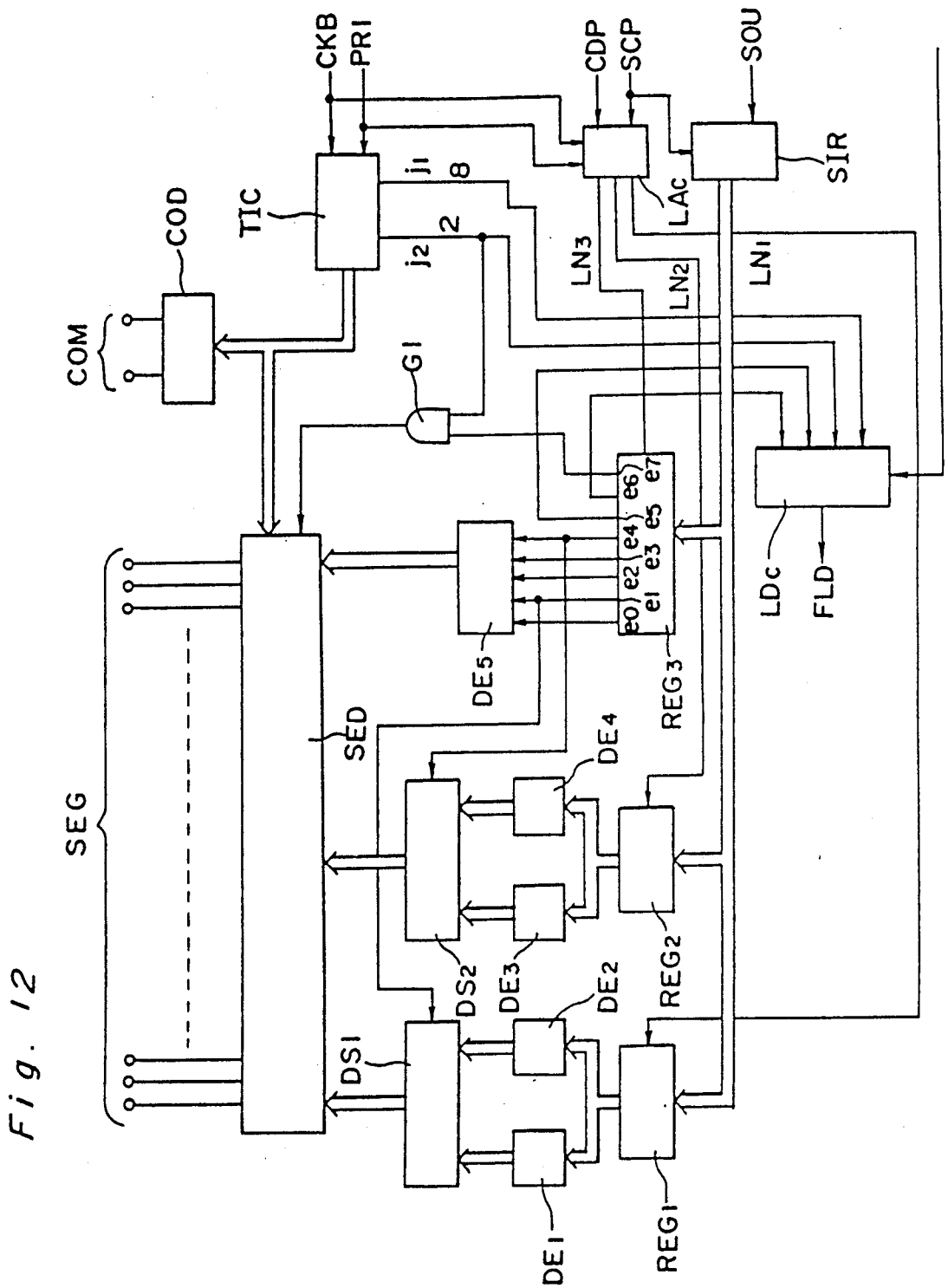
FIG. 12 is a circuit diagram showing the details of a display control DPC of FIG. 4b.

FIG. 12 illustrates the details of the display circuit shown in FIG. 4. In this circuit, when a terminal CDP becomes "High", a latch pulse is output from a latch control circuit LAC to terminals LN1, LN2 and LN3 each time eight synchronizing clock pulses SCP are input. The data read in the serial input register SIR are sequentially taken in registers REG1, REG2, and REG3. Accordingly, the exposure time or the ISO value data is stored in the register REG1, the aperture value or the override value data is stored in the register REG2, and the display mode data (that is, the content of the internal register MDR of the microcomputer MCB) is stored in the register REG3. Here, the outputs of terminals e0 to e7 correspond respectively to the bits MDR0 to MDR7 of the register MDR.

A decoder DE1 serves to convert the output of the register REF1 into a value for the display of the exposure time, and a decoder DE2 serves to convert into a value for the display of the ISO data. A data selector DS1 serves to send data from the decoder DE1 if terminal el is "High", that is, during the exposure time display mode, and to send data from the decoder DE2 if terminal el is "Low", that is, during the ISO display mode. In addition thereto, a decoder DE3 serves to convert the output of the register REG3 into a value for the display of the aperture value, and a decoder DE4 serves to convert into a value for the display of the override. Another data selector DS2 serves to send data from the decoder DE3 if terminal e4 is "High", that is, during the aperture value display mode, but it serves to send data from the decoder DE4 if terminal e4 is "Low", that is, when the mode is not the aperture value display mode. A further decoder DE5 is a decoder operable to convert data for the display of the symbol, based on data from the terminals e0 to e4 of the register REG3.

A timing signal output circuit TIC serves to output clock pulses of 8 Hz from a terminal j1 and clock pulses of 2 Hz from a terminal j2 and also to supply a timing signal both to a common signal output circuit COD and a segment signal output circuit SED. The segment signal output circuit SED serves to output a signal for the display, based on the data fed from the data selectors DS1 and DS2 and the decoder DE5, to activate a liquid crystal display. If terminal e7 of the register REG3 is "High", 2 Hz clock pulses emerge from an AND circuit G1 to cause the liquid crystal display to blink at 2 Hz.

Both signals from the terminals e5 and e6 of the register REG3 and the 8 Hz and 2 Hz clock pulses from the respective terminals j1 and j2 are supplied to a drive circuit LDC. If a terminal DPE is "High", circuit LDC produces a drive signal to terminal FLD depending on the state of the flash device.

Figure 7:
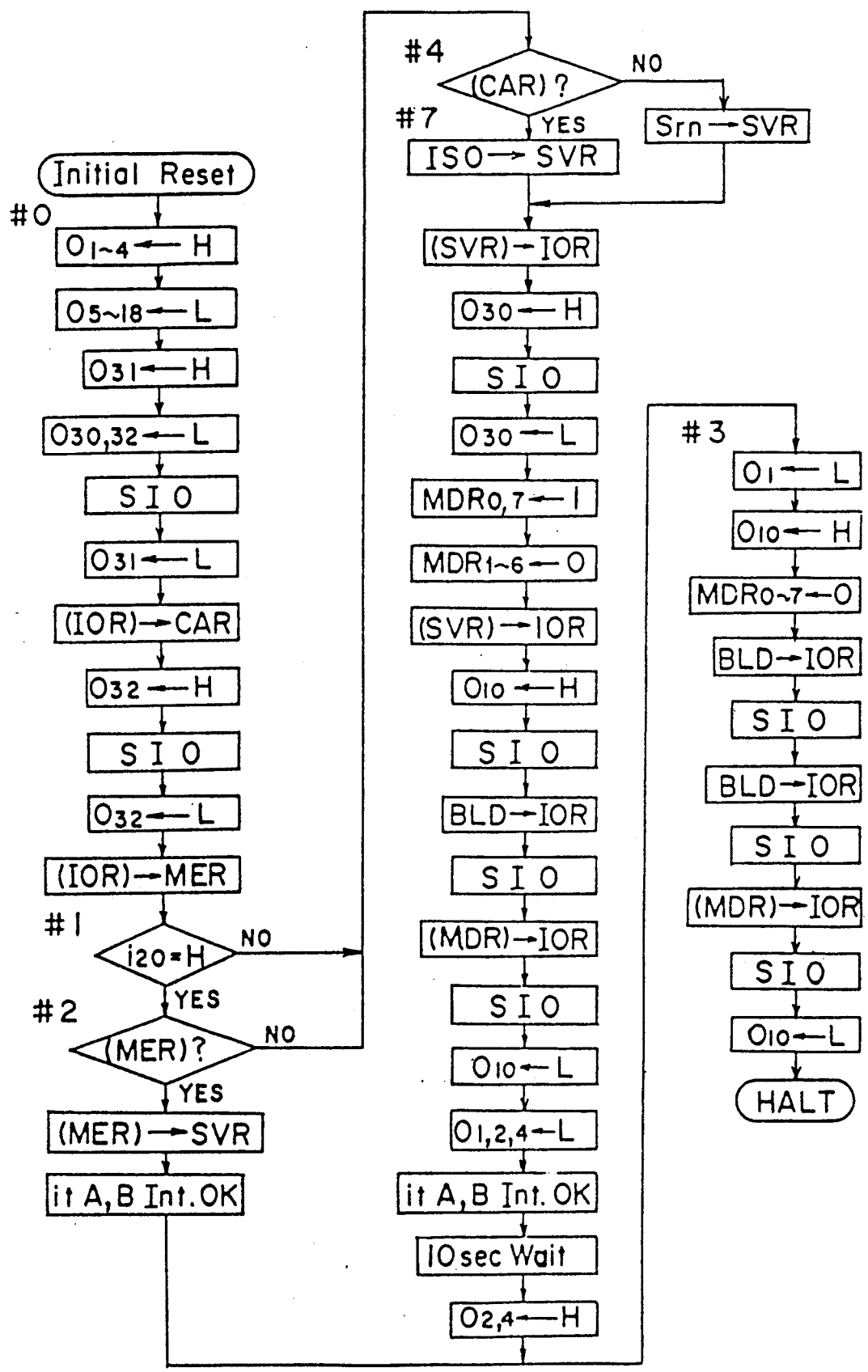
FIG. 7 is a flow chart of a microcomputer provided in the camera body, particularly showing the operations for the initial setting.
Figure 13:
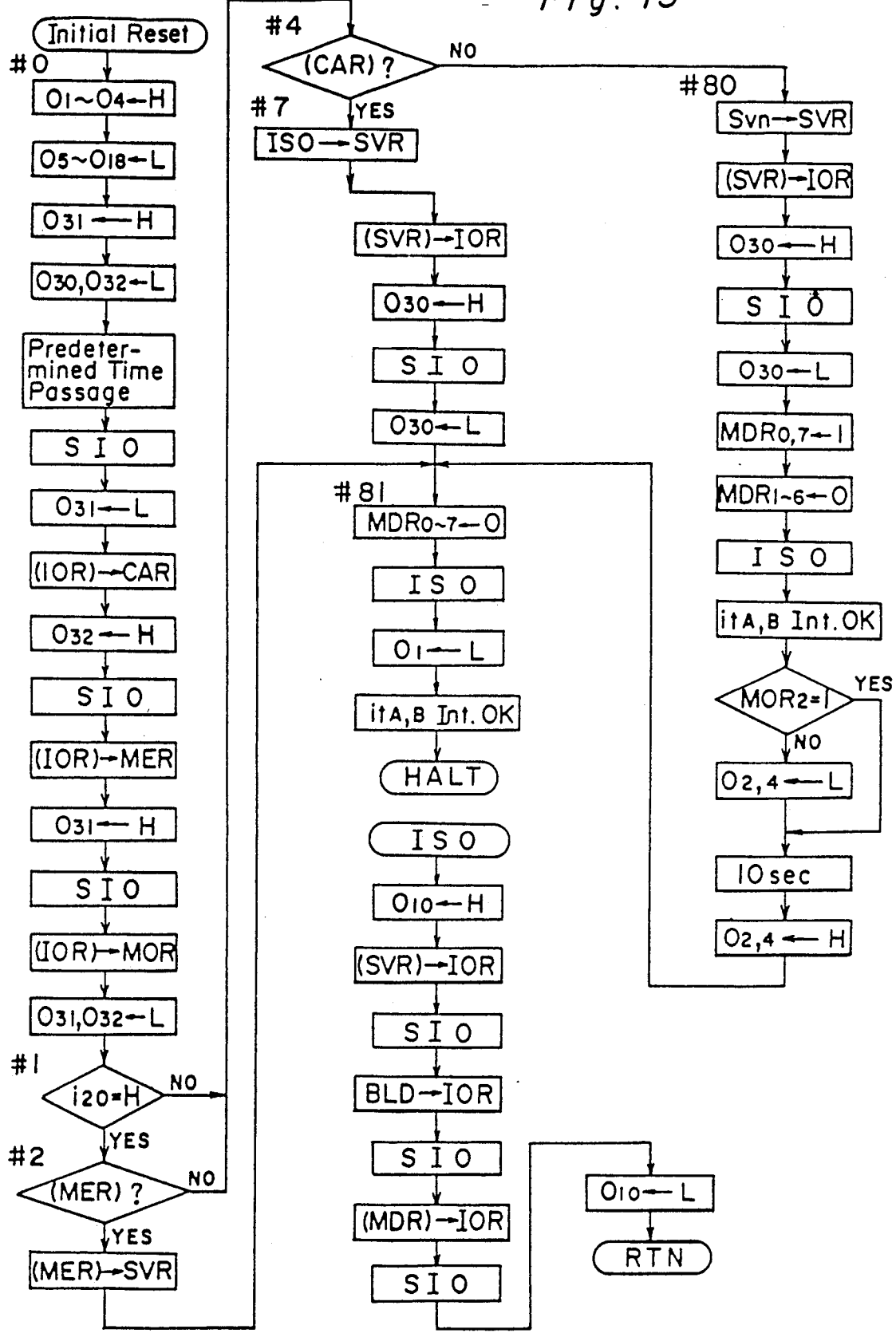
FIG. 13 is a flow chart similar to FIG. 7, but showing a modification thereof.

FIG. 13 illustrates a flow chart which is a modification of the flow chart shown in FIG. 7. The program flow to step #4 shown in FIG. 13 is the same as in FIG. 7 except that a predetermined time is allowed to pass before the data are completely read out from the film cartridge, and that both the exposure control data and the signal from the film counter switch are set in the read-out register MOR. The reason for the passage of the predetermined time allowed before the data are completely read out from the film cartridge is because, when the battery is loaded, vibration takes place to such an extent as to result in that the contact of the feelers with the film cartridge may not be stabilized and, therefore, there is the possibility that, if the data are read out from the film cartridge immediately after the loading of the battery, they would be read out erroneously. The predetermined time allowed to pass subsequent to the loading of the battery is so selected for the contact of the feelers with the film cartridge to be stabilized before the data are actually read out from the film cartridge. When it is determined at step #4 that the data has been read in from the film cartridge, the data so read out is set in the register SVR at step #7 and a program flow similar to that occurring when the back-up battery BUB is normal and the output of the register LAC is also normal is subsequently performed. This will not constitute an exposure error even if the ISO data are read in from the film cartridge at the time of the replacement of the battery, and neither the blinker display warning of the ISO data nor the release lock condition takes place.

However, if it is determined at step #4 that no data is read in from the film cartridge, the fixed ISO data (ISO 100 Svn) is set in the register SVR at step #80 and this data is displayed by blinking for ten seconds. If at this time two bits of the register MOR indicates that the counter switch CFS has not been closed, this ten seconds is utilized as a period in which no drive is effected by any switch other than the ISO switch ISS. Where the counter switch CFS is opened, since the possibility is small that the film is loaded, only the blinking of ISO is effected and no drive is effected even by S1 and ORS. Unless the ISO switch ISS is closed, the microcomputer MCB, after the passage of ten seconds, proceeds to step #81 at which the ISO display is effected and the condition is established wherein a drive can be effected by any switch, the microcomputer MCB being subsequently brought to a halt.

It is to be noted that, in the foregoing embodiment, switch SFC in FIG. 4a may be alternatively switched by detecting whether or not the film is actually loaded in the camera, e.g., by detecting the loading of the film cartridge or detecting directly the existance of the film (for example, at a film spool). In such a case the release lock condition can be disabled by detecting by means of switch SFC that the film has not yet been loaded.

FIG. 14 illustrates an example of the display according to the preferred embodiment of the present invention, wherein FIG. 14a illustrates an example of the display effected after the setting of the exposure time and FIG. 14b illustrates an example of the display effected at the time of the setting of the film sensitivity. As shown in FIG. 14a, the first display area which is used to display the shutter speed and the film sensitivity one at a time is shown as displaying the shutter speed reading 1/2000 second, while a second display area is shown as displaying another data relating to exposure, e.g., the aperture value reading F5.6. However, in FIG. 14b, the first display area is shown as displaying the film sensitivity reading ISO 400 while the second display area displays nothing. Thus, information to be displayed at the time of the setting of the shutter speed is enriched with another data displayed as well as the shutter speed. However, at the time of the setting of the film sensitivity which solely depends on an actually loaded particular film without any comparison with another data and which has no necessity to be changed depending on each shot as long as the once loaded film is continued to be used, nothing is displayed other than the film sensitivity to clarify such a nature of the film speed setting.

Although in the foregoing embodiment the data on the film cartridge are read out at a particular time after a lapse of a predetermined time period from the closure of the back lid, the concept of the present invention can be equally applicable to a type of camera wherein, with no storage for storing the read ISO information used therein, the ISO data is continuously read in at all times. In such a case, the reading of the data from the film cartridge is inhibed until the predetermined time period passes subsequent to the closure of the back lid.

In addition, although the switching of the exposure controls modes has been described as effected by means of the slide switch, it is to be noted that the same can be effected by a combination of a key for instructing the change in the exposure control mode and one of the up-shift and down-shift keys. In such a case, it should be designed that, even by a depression of the exposure control mode change instructing key, interruption can be effected to the interrupting terminal itA of the microcomputer to permit the light measurement and display to be performed.

Moreover, although in the foregoing embodiment the back-up battery and the storage circuit have been described as used for keeping the ISO data stored even when the main battery is removed for replacement purpose, they may not be always necessary. In the case of a camera without such a back-up means, the decision to make both the warning and the release lock should be effected, depending on whether or not the data is successfully read from the film cartridge upon the loading of the new main battery.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

TABLE 1

| ISO | Sv | K2 | K3 | K4 | K5 | K6 |
|---|---|---|---|---|---|---|
| 25 | 3 | X | X | X | O | X |
| 32 | 3 ⅓ | X | X | X | X | O |
| 40 | 3 ⅔ | X | X | X | O | O |
| 50 | 4 | O | X | X | O | X |
| 64 | 4 ⅓ | O | X | X | X | O |
| 80 | 4 ⅔ | O | X | X | O | O |
| 100 | 5 | X | O | X | O | X |
| 125 | 5 ⅓ | X | O | X | X | O |
| 160 | 5 ⅔ | X | O | X | O | O |
| 200 | 6 | O | O | X | O | X |
| 250 | 6 ⅓ | O | O | X | X | O |
| 320 | 6 ⅔ | O | O | X | O | O |
| 400 | 7 | X | X | O | O | X |
| 500 | 7 ⅓ | X | X | O | X | O |
| 640 | 7 ⅔ | X | X | O | O | O |
| 800 | 8 | O | X | O | O | X |
| 1000 | 8 ⅓ | O | X | O | X | O |
| 1250 | 8 ⅔ | O | X | O | O | O |
| 1600 | 9 | X | O | O | O | X |
| 2000 | 9 ⅓ | X | O | O | X | O |
| 2500 | 9 ⅔ | X | O | O | O | O |
| 3200 | 10 | O | O | O | O | X |
| 4000 | 10 ⅓ | O | O | O | X | O |
| 5000 | 10 ⅔ | O | O | O | O | O |
| | | . | . | . | . | . |
| | | 1 | 2 | 4 | ⅓ | ⅔ |

O: Conductive
X: Non-conductive

TABLE 2

| Register | Contents | Symbol |
|---|---|---|
| TVR1 | Exposure time for photo-taking | Tva |
| TVR2 | Exposure time for flash photography | Tvf |
| TVR3 | Preset Exposure time | Tvs |
| AVR1 | Aperture value for photo-taking | Ava |
| AVR2 | Aperture value for flash photography | Avf |
| AVR3 | Preset Aperture value | Avs |

TABLE 3

| Bit | CAR7 | CAR6 | CAR5 | CAR4 | CAR3 | CAR2 | CAR1 | CAR0 |
|---|---|---|---|---|---|---|---|---|
| Position | | K12 | K11 | K6 | K5 | K4 | K3 | K2 |
| Weight | | | | ⅔ | ⅓ | 4 | 2 | 1 |

TABLE 4

| Bit | Signal | Conditions |
|---|---|---|
| MDR0 | 0 | No display of SS & ISO |
| | 1 | Display SS or ISO |
| MDR1 | 0 | Display ISO |
| | 1 | Display SS |
| MDR2 | 01 | Override on + side |
| MDR3 | 10 | Override on − side |
| | 11 | Override 0 |
| | 00 | No display of Override |
| MDR4 | 0 | No display of F-stop |
| | 1 | Display F-stop |
| MDR5 | 00 | Light off indicating unloading |
| MDR6 | 01 | 2 Hz blinking indicating loading |
| | 10 | Light on indicating charge completion |
| | 11 | 8 Hz blinking indicating FDC |
| MDR7 | 0 | Light on |
| | 1 | 2 Hz blinking |

What is claimed is:

1. A camera comprising:
a microprocessor having a chip select terminal for producing a chip select signal to designate a circuit element for receiving a data signal produced by said microprocessor, and a serial output terminal for serially producing one of a plurality of data signals, each of said data signals indicating a value to be indicated and information for controlling an indicating state;
a circuit element having a first terminal connected via said chip select terminal of said microprocessor, and a second terminal connected with said serial output terminal of said microprocessor, said circuit element being operated when the chip select signal received by the first terminal designates the circuit element, and said circuit element comprising:
a serial register connected with said second terminal for receiving the data signal;
a first decoder connected with said serial register for decoding the value of data represented by the data signal received by the serial register;
a second decoder connected with said serial register for decoding the information represented by the data signal received by the serial register; and
indicating means for indicating the value decoded by said first decoder in accordance with the information decoded by said second decoder.

2. A camera as claimed in claim 1, wherein said microprocessor produces either of a set of a film sensitivity value to be indicated and its information, and a set of a shutter speed value to be indicated and its information as the data signal.

3. A camera as claimed in claim 1, wherein said microprocessor produces either of a set of an aperture value to be indicated and its information, and an override value to be indicated and its information as the data signal.

4. A camera, comprising:
a microprocessor having a chip select signal terminal for producing a chip select signal to designate a circuit element for receiving data signals produced by said microprocessor, and a serial output terminal for serially producing one of a plurality of data signals, each of said data signals indicating a value to be indicated and information for controlling an indicating state;

a circuit element having a first terminal connected with said chip select terminal of said microprocessor, and a second terminal connected with said serial output terminal of said microprocessor, said circuit element being operated when the chip select signal received by the first terminal designates the circuit element, and said circuit element comprising:

a serial register connected with said second terminal for receiving the data signal;

a first decoder connected with said serial register for decoding the value of data represented by the data signal received by the serial register;

a second decoder connected with said serial register for decoding the value represented by the data signal received by the serial register;

a third decoder connected with said serial register for decoding the information relating to the values decoded in the first and second decoders; and indicating means for indicating the value decoded by at least either of said first and second decoders in accordance with the information decoded by the third decoder.

5. A camera as claimed in claim 1, wherein said microprocessor has a clock terminal for repeatedly producing a clock signal at predetermined intervals, said circuit element has a third terminal connected with said clock terminal of said microprocessor and a clock circuit connected with said third terminal for receiving the clock signal, and wherein said serial register is connected with said second and third terminals for receiving the data signal in synchronization with the clock signal, said first decoder is connected with said serial register and said clock circuit for decoding the value of data in synchronization with the clock signal, and said second decoder is also connected with said serial register and said clock circuit for decoding the information in synchronization with the clock signal.

6. A camera as claimed in claim 4, wherein said microprocessor has a clock terminal for repeatedly producing a clock signal at predetermined intervals, said circuit element has a third terminal connected with said clock terminal of said microprocessor and a clock circuit connected with said third terminal for receiving the clock signal, and wherein said serial register is connected with said second and third terminals for receiving the data signal in synchronization with the clock signal, said first decoder is connected with said serial register and said clock circuit for decoding one of a film sensitivity value and a shutter speed value in synchronization with the clock signal, said second decoder is connected with said serial register and said clock circuit for decoding one of an aperture value and an override value in synchronization with the clock signal, and said third decoder is connected with said serial register and said clock circuit for decoding information relating to the values decoded in the first and second decoders in synchronization with the clock signal.

* * * * *